(12) United States Patent
Fluxman et al.

(10) Patent No.: US 7,203,464 B2
(45) Date of Patent: Apr. 10, 2007

(54) RAKE RECEIVER HAVING SEVERAL FINGERS AND METHOD OF PROCESSING AN INCIDENT SIGNAL THEREIN

(75) Inventors: Steven Fluxman, Crolles (FR); Xavier Chbani, Grenoble (FR); Benoît Moussu, Crolles (FR)

(73) Assignee: STMicroelectronics S.A., Montrouge (FR)

( * ) Notice: Subject to any disclaimer, the term of this patent is extended or adjusted under 35 U.S.C. 154(b) by 573 days.

(21) Appl. No.: 10/665,376

(22) Filed: Sep. 18, 2003

(65) Prior Publication Data

US 2004/0132419 A1 Jul. 8, 2004

(30) Foreign Application Priority Data

Sep. 27, 2002 (FR) ................... 02 12025

(51) Int. Cl.
*H04B 7/216* (2006.01)
*H04B 1/69* (2006.01)
*H04B 1/00* (2006.01)

(52) U.S. Cl. .................. 455/69; 455/517; 455/518; 370/335; 375/130

(58) Field of Classification Search ............... 455/518, 455/69, 517, 562.1; 375/130, 147, 148; 370/335, 370/342
See application file for complete search history.

(56) References Cited

U.S. PATENT DOCUMENTS 5,652,765 A * 7/1997 Adachi et al. ............. 455/69
5,809,020 A * 9/1998 Bruckert et al. ........... 370/335
5,982,763 A * 11/1999 Sato ......................... 370/342
5,999,560 A * 12/1999 Ono ......................... 375/148
6,137,788 A * 10/2000 Sawahashi et al. ........ 370/342

(Continued)

FOREIGN PATENT DOCUMENTS

WO       WO 02/43267        5/2002

OTHER PUBLICATIONS

Lee, S., et al., "Time-deskew buffer design for MC-CDMA rake receiver", Electronics Letters, IEE Stevenage, Great Britain, vol. 37, No. 14, pp. 920-922, dated Jul. 5, 2001, PX006016841.

(Continued)

*Primary Examiner*—Lana Le
(74) *Attorney, Agent, or Firm*—Jenkens & Gilchrist, PC

(57) ABSTRACT

Address pointers (PTFi) associated with corresponding fingers are set to the addresses of a memory means (MM) capable of storing a number of symbols larger than the maximum delay between the paths, these initial addresses being predetermined taking account of differences in the number of symbols between the paths. Under steady state conditions, a current symbol received on a first finger is stored in the said memory at the write address given by the corresponding address pointer, and the said address pointer is then incremented. Before reception of the next symbol on this first finger, the contents of the memory stored at the read addresses denoted by all the other address pointers, are extracted in sequence, these contents are summed (ADD) with the symbols present on the other fingers and, except for the sum corresponding to the last finger, these sums are stored at the same read addresses before incrementing all the other pointers, the last sum corresponding to the last finger being delivered at the output from the receiver.

26 Claims, 24 Drawing Sheets

U.S. PATENT DOCUMENTS

| | | | |
|---|---|---|---|
| 6,215,814 B1 * | 4/2001 | Ylitalo et al. | 375/148 |
| 6,278,724 B1 * | 8/2001 | Zhou et al. | 375/147 |
| 6,373,832 B1 * | 4/2002 | Huang et al. | 370/342 |
| 6,529,545 B2 * | 3/2003 | Tiirola et al. | 375/148 |
| 6,611,512 B1 * | 8/2003 | Burns | 370/335 |
| 7,031,737 B1 * | 4/2006 | Braam et al. | 455/518 |
| 2003/0202565 A1 * | 10/2003 | Li et al. | 375/147 |
| 2004/0013173 A1 * | 1/2004 | Aldridge et al. | 375/130 |
| 2004/0028013 A1 * | 2/2004 | Fitton et al. | 370/335 |

OTHER PUBLICATIONS

French Search Report, FR 0212025, dated Jun. 18, 2003.

* cited by examiner

1st cycle

2nd cycle

3rd cycle

4th cycle

5th cycle

6th cycle

17th cycle

18th cycle

20th cycle

37th cycle

85th cycle

86th cycle

1st cycle

2nd cycle

17th cycle

34th cycle

37th cycle

RAKE RECEIVER HAVING SEVERAL FINGERS AND METHOD OF PROCESSING AN INCIDENT SIGNAL THEREIN

PRIORITY CLAIM

The present application claims priority from French Application for Patent No. 02 12025, filed Sep. 27, 2003, the disclosure of which is hereby incorporated by reference.

BACKGROUND OF THE INVENTION

1. Technical Field of the Invention

The present invention relates to the processing of incident signals in a signal receiver.

2. Description of Related Art

Receivers are known that combine several multi-path signal components mutually retarded by different time delays before reaching the receiver.

For example, one such receiver is present in Code Division Multiple Access (CDMA) wireless communication systems, that experts in the subject usually call a "RAKE" receiver.

In a wireless communication system, a base station communicates with several remote terminals such as mobile cell phones. Frequency Division Multiple Accesses (FDMA) and Time Division Multiple Accesses (TDMA) are traditional multiple access schemes to supply simultaneous services to a number of terminals. The basic idea on which the FDMA and TDMA systems are based is to share the available resource into several frequencies or several time slots respectively, such that several terminals can operate simultaneously without causing interference.

Telephones operating according to the GSM standard belong to the FDMA and TDMA systems in the sense that transmission and reception take place at different frequencies and also at different slots.

Unlike these systems that use a frequency division or a time division, CDMA (code division multiple access) systems enable multiple users to share a common frequency and a common timing channel, by using a coded modulation. CDMA systems include the CDMA 2000 system, the wide band CDMA (WCDMA) system, and the IS-95 standard.

As is well known to an expert in the subject, a scrambling code is associated with each base station in CDMA systems to make a distinction between one base station and another. Furthermore, an orthogonal code known to an expert in the subject as the "OVSF (Orthogonal Variable Spreading Factor) code," is allocated to each remote terminal (for example like a mobile cell phone). All OVSF codes are orthogonal with each other, so that one channel can be distinguished from another.

Before transmitting a signal on the transmission channel to a remote terminal, the signal is scrambled and spread by the base station using the scrambling code of the base station and the OVSF code of the channel.

In CDMA systems, a distinction can still be made between systems that use a distinct frequency for transmission and for reception (CDMA-FDD system) and systems that use a common frequency for transmission and reception, but have distinct time domains for transmission and reception (CDMA-TDD system).

An incident signal, for example received by a mobile phone, comprises several versions of the initially transmitted signal with different time delays. These versions of the initial signal are the result of the multi-path transmission characteristics of the transmission medium between one base station and the telephone. It is recognized that each path introduces a different delay.

The "RAKE" receiver installed in a mobile cell phone operating in a CDMA communication system is used to make the time alignment, descrambling, despreading, the channel correction and the combination of delayed versions of the initial signals, so as to deliver information flows (symbols) contained in the initial signals.

All of these functions require the use of considerable memory means and/or a high operating frequency and large adders, particularly for the combination means of the receiver. The result is not only larger and more expensive equipment, but also higher power consumption.

SUMMARY OF THE INVENTION

The present invention is advantageously applicable to CDMA type communication systems, and more particularly to WCDMA systems with terrestrial radio accesses (UTRA FDD/TDD).

The present invention is intended to overcome the disadvantages of the prior art and its purpose is particularly to propose a combination of delayed versions of signals within a receiver, requiring a small memory and low operating frequency, and a single symbol size adder.

Particularly in CDMA systems, symbols are transmitted within successive frames, each frame being subdivided into a number of slots. Each slot transports a number of symbols, each symbol being composed of a predetermined number of chips. The first symbol (the zero symbol) is received at the beginning of each slot. In accordance with the invention the Rake receiver operation is started at the beginning of the frame or slot, or during a frame or a slot.

Another purpose of the invention is to facilitate addition and/or elimination of fingers, even during a frame or a slot. Therefore, the present invention proposes a method of processing an incident signal within a "RAKE" receiver with several fingers, comprising reception of the incident signal formed of symbols output from at least one multi-path transmission channel for which each path transports a delayed version of the signal, detection of paths and allocation of these paths to at least some of the fingers, and a combination of the information output from each finger assigned to a path, within a memory means.

According to one general characteristic of the invention, the memory means is capable of storing a number of symbols larger than the maximum delay between the paths (expressed as a number of symbols) and can be addressed by address pointers associated with the corresponding fingers.

A first finger and a last finger are defined, in other words the finger that corresponds to the leading path and the finger that corresponds to the trailing path.

The combination step then includes a steady state phase in which the address pointers point to addresses with mutual spacings taking account of mutual delays between the paths, and in which a current symbol received on a first finger is stored in the said memory at the write address denoted by the corresponding address pointer, and this address pointer is then incremented.

And before reception of the next symbol on this first finger, the contents of the memory stored at the read addresses denoted by all the other address pointers, are extracted in sequence, these contents are summed in sequence with the symbols present on the other fingers and, except for the sum corresponding to the last finger, then these sums are stored at the same read addresses before incrementing all the other pointers (including the pointer corresponding to the last finger).

The last sum corresponding to the last finger is then delivered at the output from the receiver.

The combination step also advantageously comprises a transient phase. And this transient phase is different depending on the case.

Thus according to one embodiment of the invention, for example starting up the receiver at the beginning of the frame or slot, the combination step comprises a transient phase in which the initial addresses of the address pointers are all equal to the same initial value, for example zero, the different fingers output symbols progressively and at corresponding different instants, and the same processing is done in this transient phase as is done in the steady state phase, and for the fingers on which the symbols are present.

In other words, according to this embodiment, the fingers will progressively become "active" as they receive symbols, and the address pointers will progressively be incremented until the last finger has received a symbol. At this moment, the steady state phase will begin and the address pointers are mutually spaced by a number of symbols corresponding to the different delays between the paths.

According to another embodiment of the invention, for example when the receiver is started during a frame or a slot, or when changing the configuration of the receiver during a frame or a slot, the combination step comprises a transient phase in which the initial addresses of the address pointers are predetermined taking account of any differences in the number of symbols between the paths.

However, if exactly the same processing is done in the transient phase as in the steady state phase, in other words in particular the last sum corresponding to the last finger is delivered at the output from the receiver, then information corresponding to incomplete combinations of symbols is output during this transient phase.

This is why it is preferable to carry out the same processing in the transient phase as in the steady state phase, except for delivering the last sum corresponding to the last finger at the output from the receiver. In other words, no information is produced at the output from the receiver as long as the transient phase is not finished.

According to one embodiment of the invention in which each symbol is composed of several chips, for example four chips, the rate of the combination step is controlled by a clock signal with a period equal to the duration of one chip divided by a predetermined number, usually a small number (for example equal to four in this case). The next step is to extract the memory contents denoted by a pointer during one cycle of the clock signal and the pointer corresponding to the next cycle is incremented.

Normally, a memory has to be initialized before its contents can be read. Instead of doing this, the present invention advantageously avoids an additional write cycle by using a multiplexer that adds zero to the value of the symbol on the first finger before writing it in memory.

According to one preferred embodiment of the invention, the number of symbols that can be stored in the memory means is equal to the number of symbols corresponding the maximum delay between paths, plus one symbol.

Another purpose of the invention is to provide a "RAKE" receiver comprising:

a signal input to receive an incident signal formed from symbols output from at least one multi-path transmission channel in which each path transports a delayed version of the signal, several fingers, each intended to demodulate a given path at a given instant, a control unit designed to detect paths and allocate them to at least some of the fingers, and a combination unit connected to the output from the fingers and designed to sum the information produced at the output from each finger.

According to one general characteristic of the invention, the combination unit comprises:

a memory means capable of storing a number of symbols corresponding to the maximum delay between the paths, address pointers associated with each corresponding finger, and processing means with a steady state phase during which the address pointers point to addresses with mutual spacings taking account of the mutual delays between the paths, these processing means being capable of receiving a current symbol on a first finger during the steady state phase, storing it in the said memory at the write address given by the corresponding address pointer, and then incrementing the address pointer.

Furthermore, the processing means can also perform the following steps in the steady state phase, before reception of the next symbol on the first finger, read the contents of the memory stored at the read addresses denoted by the other address pointers, in sequence, sum these contents with the corresponding symbols present on the other fingers, and then store these sums, except for the sum corresponding to the last finger, at the same read addresses before incrementing the pointers, the last sum corresponding to the last finger being delivered at the output from the combination unit.

According to one embodiment of the invention, the processing means have a transient phase during which the initial addresses of the address pointers are all equal to the same initial value, for example zero, the different fingers delivering symbols progressively and at different instants, and the processing means are capable of performing the same processing during this transient phase as during the steady state phase, and for the fingers on which the symbols are present.

According to one preferred embodiment of the invention, the processing means have a transient phase in which the initial addresses of the address pointers were predetermined taking account of offsets in the number of symbols between paths, and the processing means comprise inhibition means that are capable of preventing delivery of the last sum corresponding to the last finger at the output of the receiver during the transient phase.

According to one embodiment of the invention in which each symbol is composed of several chips, the rate of the processing means is controlled by a clock signal with a period equal to the duration of one chip divided by a predetermined number (for example four) and the processing means extract the contents of the memory denoted by a pointer during one cycle of the clock signal and increment the corresponding pointer in the next cycle.

Advantageously, the processing means comprise means of using the memory contents without the memory being initialized in advance. For example, this is done using a multiplexer by adding zero to the value of the symbol on the first finger before writing it in memory.

According to one embodiment of the invention, in which each finger comprises several means of demodulating the transmission channels, several combination units are provided connected to the corresponding demodulation means of the different fingers.

The receiver according to the invention is advantageously made in the form of an integrated circuit.

Another purpose of the invention is a wireless communication system incorporating a receiver like that defined above.

For example, this component may be a mobile cell phone.

BRIEF DESCRIPTION OF THE DRAWINGS

A more complete understanding of the method and apparatus of the present invention may be acquired by reference to the following Detailed Description when taken in conjunction with the accompanying Drawings wherein:

FIGS. 7a to 7l show an example of the variation of address pointers along the memory incorporated in the combination unit of the receiver according to the invention.

DETAILED DESCRIPTION OF THE DRAWINGS

Figure 1:
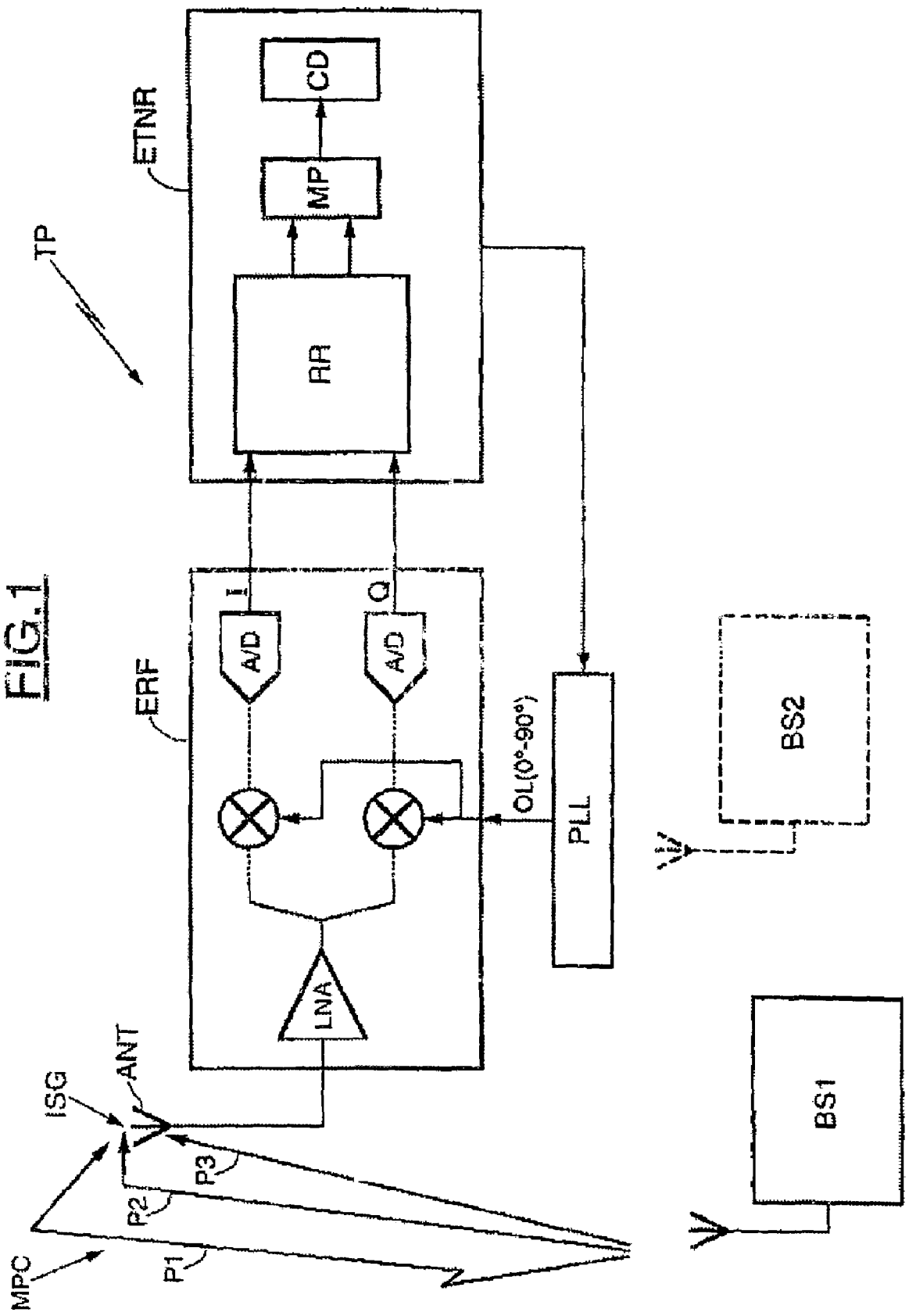
FIG. 1 diagrammatically illustrates a mobile cell phone according to the invention, incorporating a "RAKE" receiver according to the invention.

In FIG. 1, the reference TP denotes a remote terminal such as a mobile cell phone that is in communication with a base station BS1, for example according to a CDMA-FDD type communication scheme.

The mobile cell phone conventionally comprises an analog radio frequency stage ERF connected to an antenna ANT to receive an input signal ISG.

Figure 2:
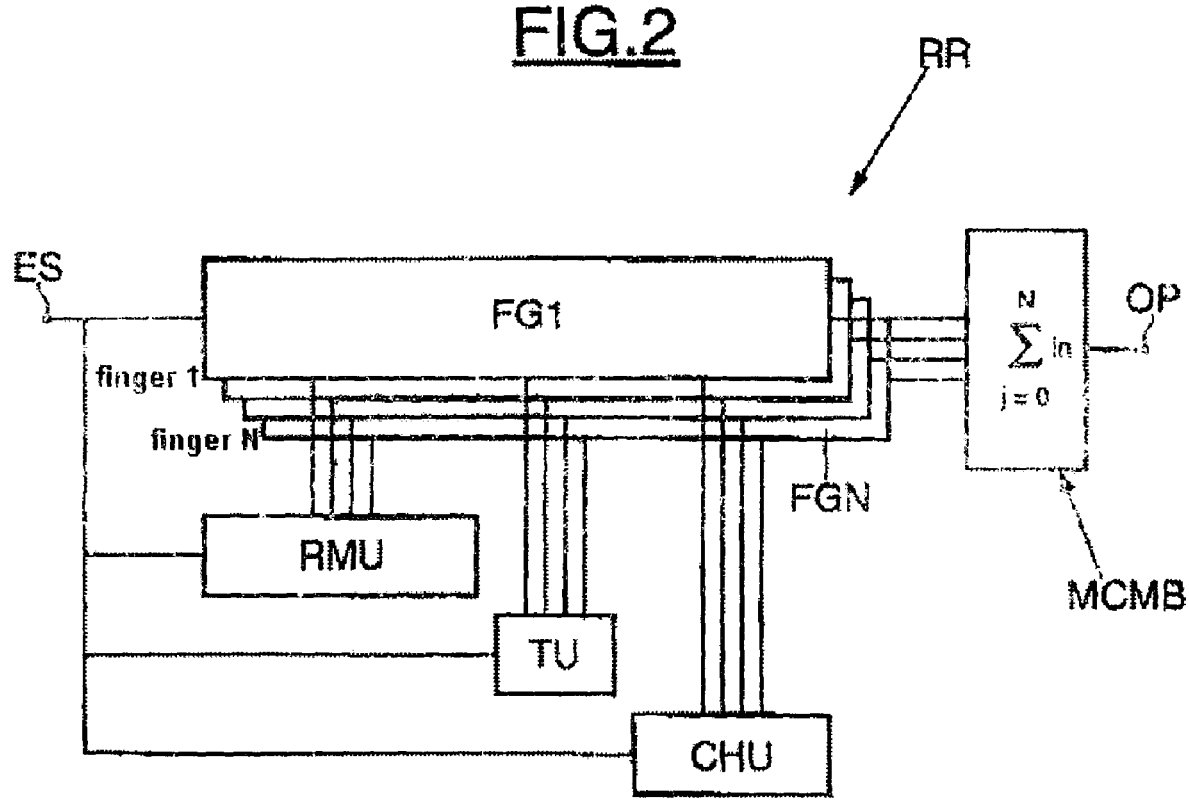
FIGS. 2 to 4 diagrammatically illustrate the functions and an internal architecture of a "RAKE" receiver according to the invention.

Conventionally, the ERF stage comprises a low noise amplifier LNA and two processing channels comprising mixers, filters and conventional amplifiers (not shown in FIG. 2 for simplification reasons). The two mixers receive two signals with a phase difference of 90°, from a phase locked loop PLL. After frequency transposition in the mixers, the two processing channels define two flows, flow I (direct flow) and flow Q (data flow in quadrature), according to the nomenclature well known to an expert in the subject.

After digital conversion in analog/digital converters, the two data flows I and Q are delivered to a reception processing stage ETNR.

This processing stage ETNR comprises a receiver RR, commonly called a "RAKE receiver" by experts in the subject, followed by conventional demodulation means MP that demodulate the constellation delivered by the Rake receiver RR. The means MP are followed by a conventional channel decoder CD.

Due to possible reflections of the initially transmitted signal on obstacles located between the base station and the mobile phone, the transmission medium is actually a multi-path transmission medium MPC, in other words comprising several different transmission paths (three transmission paths P1, P2, P3 are shown in FIG. 1). Consequently, the signal ISG received by the mobile phone comprises different time delayed versions of the initially transmitted signal, versions that are the result of multi-path transmission characteristics of the transmission medium. And each path introduces a different delay. Obviously, the received signal ISG may also result from the transmission of initial signals transmitted by different base stations BS1 and BS2.

FIG. 2 diagrammatically illustrates the basic functions of the Rake receiver RR.

This receiver is formed of several fingers (in this case N fingers) FG1–FGN. Each finger is designed to demodulate a given received path at a given instant. Base band demodulation consists essentially of descrambling and despreading. Despreading is actually a correlation and consequently requires integration on the symbol period. The receiver then combines information received on each finger in the combination means MCMB, by summing them after correcting phase and amplitude distortions of each path (CHU unit described below). Obviously, the multiple fingers shown in FIG. 2 may be formed on the same physical finger, reconfigured N times to make N functional fingers.

The receiver also comprises a CHU unit capable of supplying a transmission channel estimate, particularly to correct channel distortions.

The paths with the greatest energy have to be detected, and then allocated to fingers. This is done using an RMU control unit with a known structure.

Finally, since the relative timing of paths can vary with time, a tracking unit (TU) with a known structure tracks the timing of the paths and updates the fingers with this information.

Figure 3:
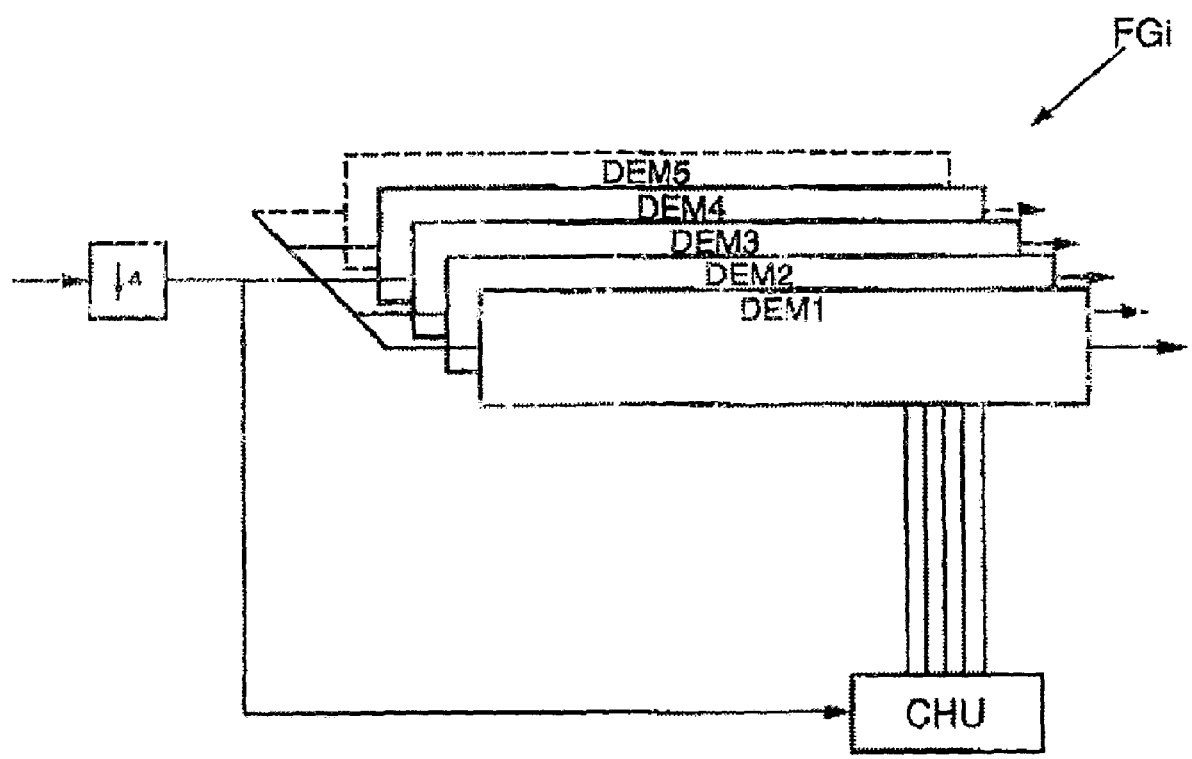

FIG. 3 shows that each finger FGi comprises a code generator CG capable in particular of producing scrambling codes and OVSF codes, an undersampler, actually a one-in-four undersampler placed at the input to the finger, and a channel estimating unit CHU.

Furthermore, the finger FGi comprises several physical transmission channel demodulators, actually five demodulators DEM1–DEM5. Each channel demodulator performs the descrambling, despreading and integration functions, and also the channel correction functions mentioned above. The unit CHU is shared by all physical transmission channels.

Figure 4:
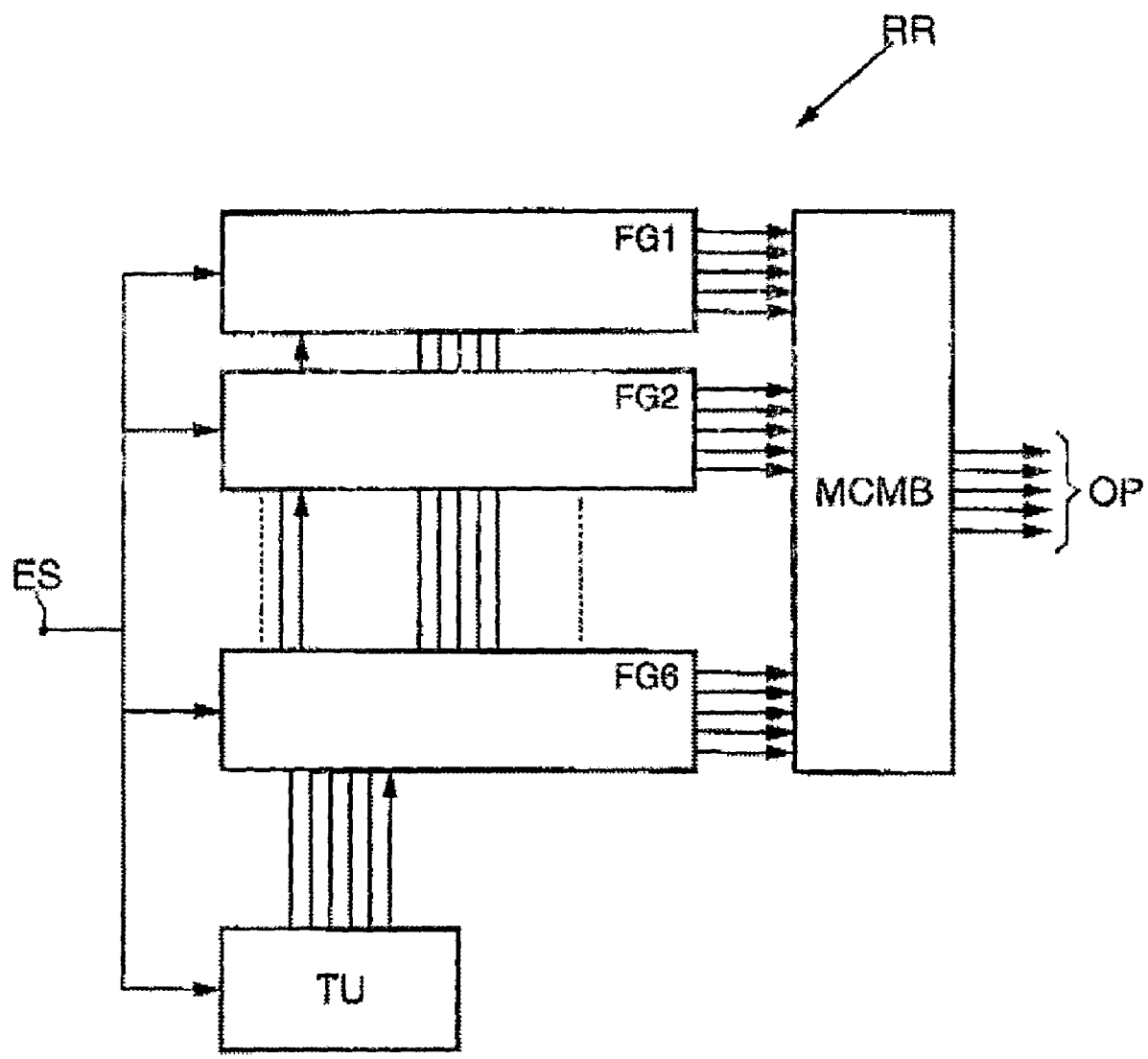

FIG. 4 partially illustrates an example of an internal architecture of a RAKE receiver RR according to the invention, showing the receiver between the signal input ES and the output OP that delivers information about the different physical transmission channels (in this case five physical channels) and the fingers of the receiver, in this case six fingers FG1–FG6, connected in output using MCMB combinations.

In this case, these combination means MCMB are actually composed of one combination unit for each physical channel. One combination unit UCMB like that illustrated in FIG. 5 and that will be described in more detail below, is actually connected to the five corresponding demodulators containing the six corresponding fingers FG1 to FG6.

Figure 5:
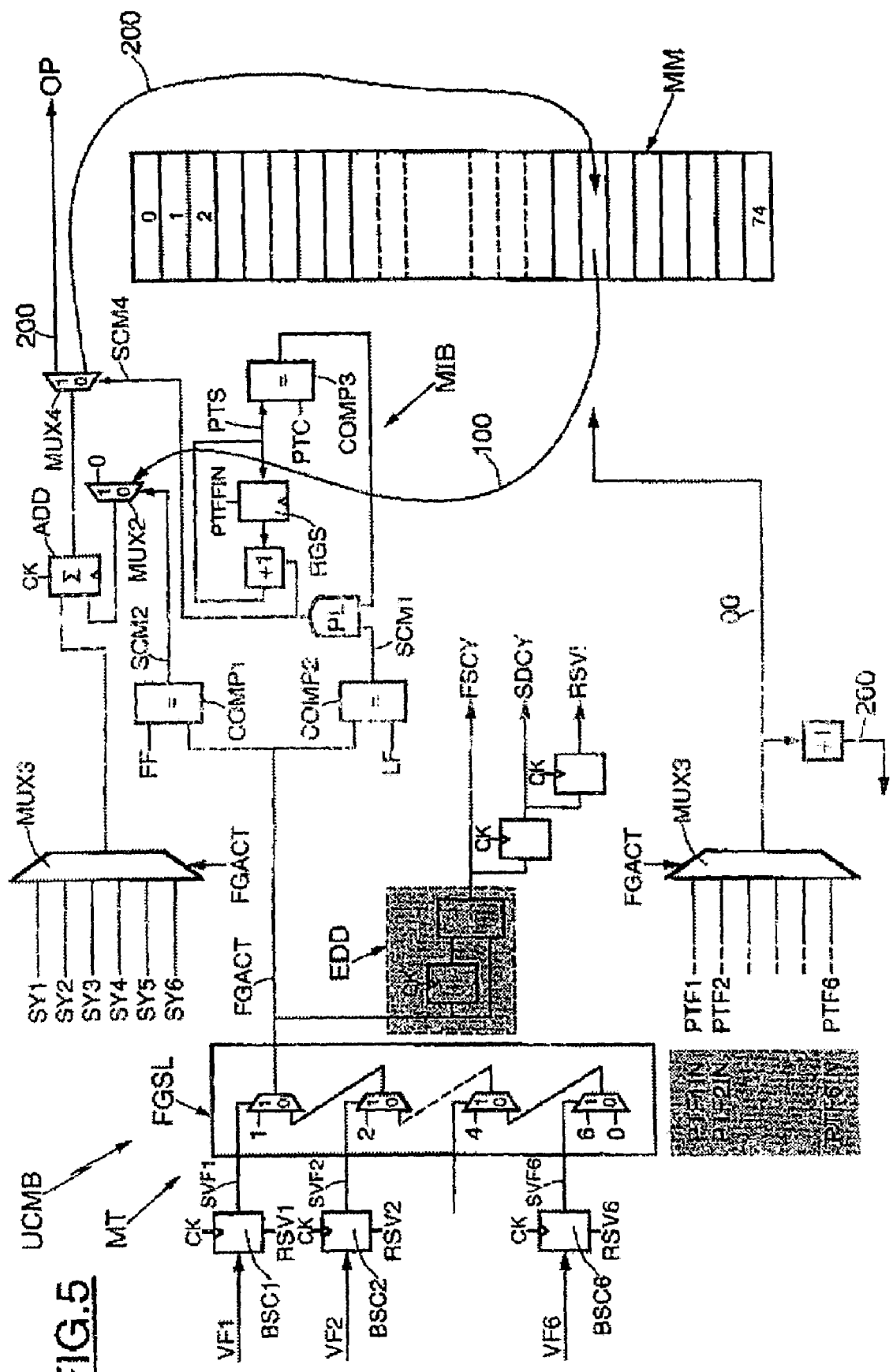
FIG. 5 illustrates more details of an embodiment of a combination unit of a receiver according to the invention, used to implement the process according to the invention.

We will now more particularly refer to FIG. 5 to describe one of these combination units UCMB, connected to the six demodulators of the six fingers all assigned to the same physical transmission channel.

The duration of a chip in the case of an UTRA FDD system is 260.417 ns. Therefore, with a spreading factor of 4 (each symbol is formed from four chips), the duration of a symbol is of the order of 1.04 microseconds. According to this transmission standard, the maximum delay between fingers is very often of the, order of about ten microseconds and in the worst case can be as high as 77 microseconds (296 chips) that corresponds to 74 symbols for a spreading factor of 4. In prior art, scanning of the complete window to detect any fingers would have required 74 processing operations between symbols, in other words one every 1.04 microseconds. The corresponding operating frequency is more than 70 MHz.

However, the UCMB combination unit according to the invention is controlled by a clock signal CK with a period equal to the duration of a chip divided by 4 for a UTRA FDD system. In practice, the period of a clock signal is equal to 65.1042 ns corresponding to an operating frequency of 15.36 MHz.

One of the elements of this combination unit UCMB consists of a memory MM capable of storing a number of symbols equal to the number of symbols corresponding to the maximum delay between paths, plus one symbol.

More precisely, if the maximum delay between the paths is 296 chips corresponding to 74 symbols for a spreading factor equal to four, the memory MM must then be capable of storing at least 74+1, in other words 75 symbols, in order to avoid loss of information. Thus in this case, a memory MM will be chosen capable of storing 75 symbols at the addresses that are deliberately indicated in a simplified form by numbers 0 to 74 in FIG. 5.

The unit UCMB also comprises processing means MT, comprising a multiplexer MUX1 at the input capable of receiving symbols SY1–SY6 on its six inputs, delivered successively by the corresponding six fingers of the receiver. This multiplexer MUX1 is controlled by a signal FGACT representative of the so-called "active" finger, in other words actually processed at a given instant.

This signal FGACT is delivered by finger selection means FGSL. In this respect, each symbol present at the output from a finger is assigned a validity signal VFi. For example, a signal VFi equal to 1 means that the symbol on the corresponding finger FGi is present, and that the finger may be considered as being an active finger.

Each validity signal VFi is memorized in a flip-flop BSCi controlled by the clock signal CK and reset to 0 by a signal RSVi.

As will be seen in more detail later, the function of these flip-flops is to memorize signals VFi until the processing means MT have processed the corresponding symbol.

The selection means FGSL, in this case formed from six 2:1 multiplexers connected in series, and controlled by the corresponding flip flop outputs BSCi, will successively select the fingers considered as being active and will produce the control signal FGACT that will successively be set equal to the values of the active fingers so as to select the corresponding symbols.

The receiver control unit RMU will also define which is the first finger of the receiver in other words which is the leading finger, and which is the last finger of the receiver, in other words the finger that will have the greatest delay, in each configuration. The first finger is referenced in FIG. 5 by reference FF and the last finger is referenced by reference LF.

The combination unit UCMB also comprises an adder ADD with the size of one symbol, controlled by the clock signal CK. This adder has a first input connected to the output from multiplexer MUX1 and a second input connected to the output from a second multiplexer MUX2.

The output from the adder ADD is connected to the input of a demultiplexer MUX4 with two outputs.

As can be seen in FIG. 5, the multiplexer MUX2 has a first cabled input set to 0, and a second input to which the contents stored at a given address of the memory MM will be applied.

This multiplexer MUX2 is controlled by a control signal SCM2 that is actually an output signal delivered by a comparator COMP1 that will compare the value of the signal FGACT with the value of the signal FF. In other words, the control signal SCM2 defines whether the finger that is active at a given instant is or is not the first finger.

Similarly, a comparator COMP2 delivers a signal SCM1 defining whether the currently active finger is or is not the last finger.

This signal SCM1 is applied to one of the inputs of an AND logical gate reference PL, and a control signal SCM4 that controls multiplexer MUX4 is applied to the output from this logical gate.

Thus, depending on the value of this control signal SCM4, under steady state conditions the signal present at the input to the multiplexer MUX4 will either be delivered to the output OP from the combination unit UCMB, or written in the memory MM at the address defined by a current address pointer PTC.

In this respect, a multiplexer MUX3, also controlled by the FGACT signal, will define which of the address pointers PTF1–PTF6 associated with the six fingers of the receiver, will form the current address pointer PTC.

Furthermore, incrementing means will be useful for incrementing the current pointer PTC by one unit, as will be seen in more detail later.

The initial values of the address pointers PTFi, referenced PTF1IN–PTF6IN respectively, are predetermined and are fixed by the control unit RMU for each new configuration, and when a frame or a slot is in progress, take account of mutual differences in symbols between the different paths.

In other situations, these initial values of pointers are identical and will for example be equal to 0, particularly when starting at the beginning of a frame or a slot.

The logical gate PL forms part of the inhibition means MIB that will be reviewed again in further detail to describe the function.

In this case, these inhibition means MIB comprise a register RGS initialized at the beginning of each configuration by the control unit RMU to the initial value PTFFIN of the address pointer for the first finger FF. This register may or may not be incremented by one unit as a function of the output signal SCM4 output by the logical gate PL.

The inhibition means MIB also comprise a comparator COMP3 comparing the value of the current pointer PTC with the value of a summation pointer PTS, that has the value contained in the register RGS.

The output from the comparator COMP3 is applied to the other input of the logical gate PL.

Furthermore, the processing means MT comprise transition detection means EDD with a conventional structure known in itself, to which the FGACT signal is applied and which delivers a signal FSCY representing a first cycle of the clock signal.

These means EDD are followed by a flip-flop controlled by the clock signal CK and that outputs a signal SDCY representing the next cycle of the clock signal (second cycle).

This flip-flop is itself followed by another flip-flop also controlled by the clock signal CK, the output of which produces the reset signal RSVi associated with the validation signal VFi of the finger FGi assumed to be active, during the third cycle of the clock signal.

We will now describe an example operation of the combination unit UCMB in more detail, particularly with reference to FIGS. 5, 6 and 7a to 7l.

Figure 6:
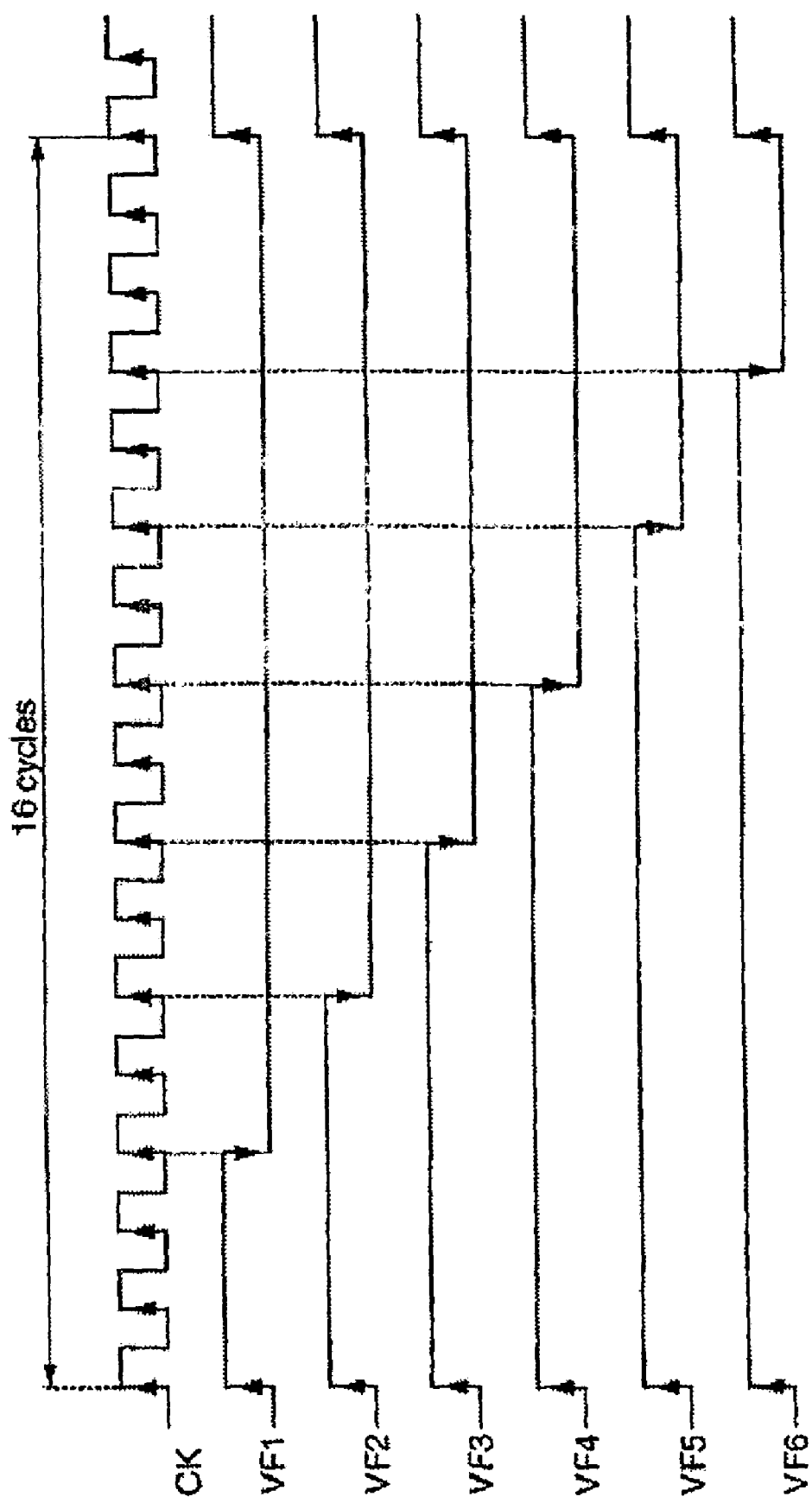
FIG. 6 shows a time diagram related to an embodiment of the process according to the invention.

As an example, in FIG. 6 it is assumed that the six fingers are active and that finger No. 1 is the first finger, while finger No. 6 is the last finger.

It can be seen in FIG. 6 that, as mentioned above, the corresponding validation signals SVFi output from the flip-flops are kept active as long as the symbol corresponding to the active finger at a given instant has not been completely processed by the processing means MT of the combination unit UCMB. The symbols are processed in series one after the other, beginning with the first finger and continuing until the last finger. A symbol is processed in two cycles of the clock signal, the signal to reset the active finger validation signal being output during the third cycle.

Consequently, the six fingers are processed in twelve cycles, which leaves a margin of four cycles before the next symbols are applied to the corresponding fingers, if the spreading factor is equal to 4.

In FIG. 5, the number 100 denotes a step carried out for a finger considered to be active during the first cycle of the clock signal, while the number 200 denotes a step carried out during the second cycle of the clock signal.

In general, in the steady state phase, a current symbol received on a first finger is stored in the memory MM at the write address denoted by the corresponding address pointer (during the first cycle).

This address pointer is then incremented (second cycle).

And, before this next symbol is received on the first finger:

the contents of the memory stored at the read addresses denoted by all the other address pointers (first cycles), are extracted successively, these contents are summed in turn with the symbols present on the other fingers (first cycles), and these sums are then stored in sequence except for the sums corresponding to the last finger, at the same read addresses, before incrementing all the other pointers (second cycles), the last sum corresponding to the last finger being delivered to the output from the receiver (during the second cycle).

Obviously, incrementing the pointer after it has reached the address 74 will once again result in address 0.

We will now illustrate more precisely this embodiment for a special case with particular reference to FIGS. 7a to 7l, corresponding to the combination unit being started during a slot, or a configuration being changed during a slot. In this respect, and for simplification purposes, it will be assumed that only three out of the six fingers, namely fingers 1, 2 and 3, are active in FIGS. 7a to 7l. Furthermore, it is also assumed that finger No. 1 is the first finger, while finger No. 3 is the last finger. Finally, it is assumed that the path associated with the second finger is delayed by two symbols with respect to the path associated with the first finger, while the path associated with the third finger is delayed by three symbols with respect to the path associated with the second finger. And the spreading factor is equal to 4.

Figure 7A:
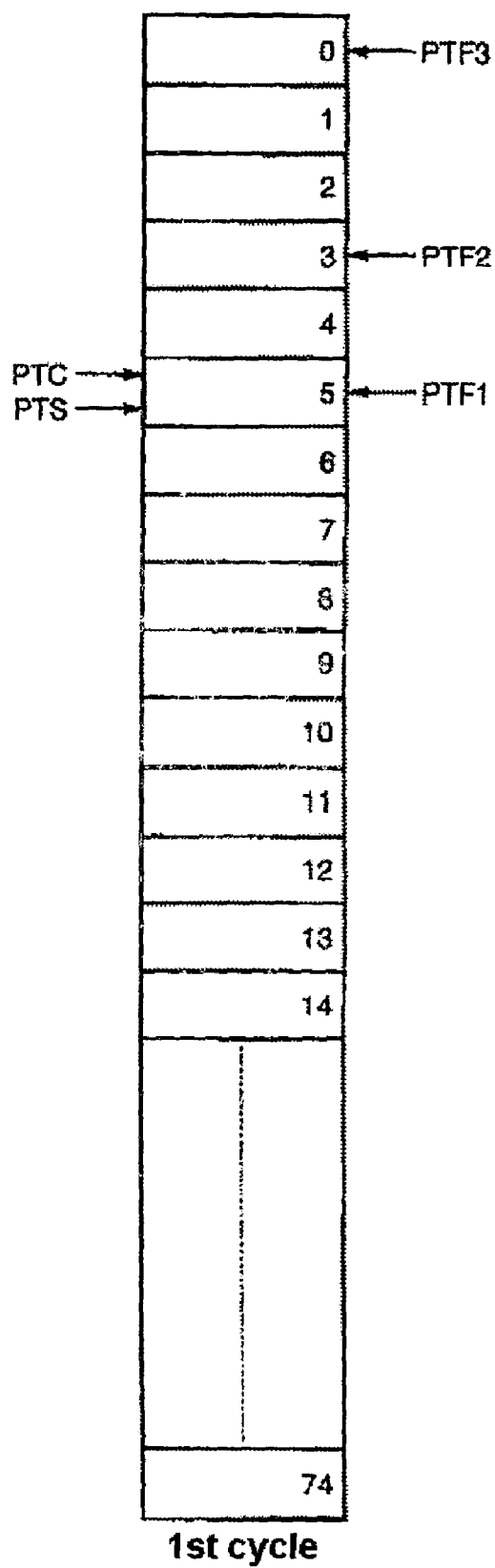

FIG. 7a shows the initial values of the different address pointers. In this respect, it is assumed that the pointer PTF1 associated with finger No. 1 initially points to address 5, while pointer PTF2 associated with finger No. 2 initially points to address 3 and pointer PTF3 associated with finger No. 3 initially points to address 0.

The summation pointer PTS is initialized to the same address as the address corresponding to the initial value of the pointer for the first finger, in other words pointer PTF1.

In FIG. 7a, finger No. 1 is active. Consequently, during the first cycle of the clock signal, the current pointer PTC is equal to pointer PTF1 and points to address 5. On the other hand, the signal SCM2 output from the comparator COMP1 indicates that this finger is the first finger. Consequently, the output from the multiplexer MUX2 is equal to 0 and the adder ADD produces the symbol SY1 received on this first finger, on its output. Therefore, the multiplexer MUX2 is a means of starting from zero, although the contents of the memory located at address 5 is not necessarily equal to zero.

On the other hand, the control signal SCM4 is equal to 0, since this finger does not correspond to the last finger. Consequently, during the second cycle of the clock signal, the symbol present on the first finger in the memory MM is stored at the address pointed to by pointer PTF1, in other words address 5.

Figure 7B:
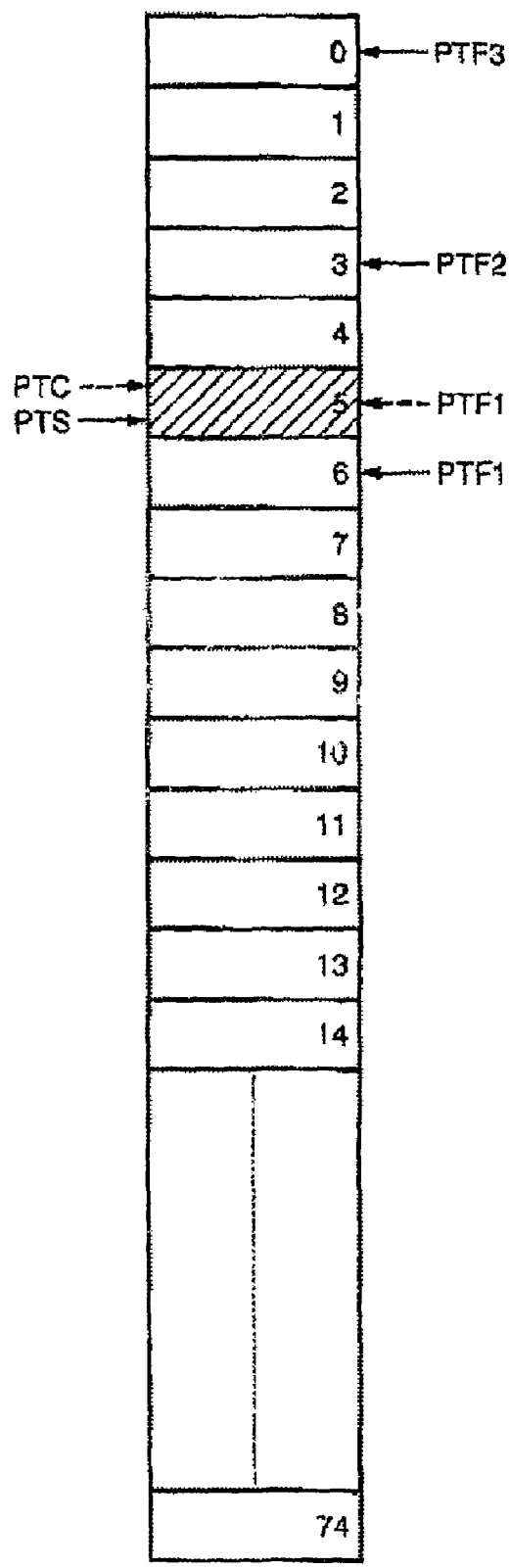
Figure 7C:
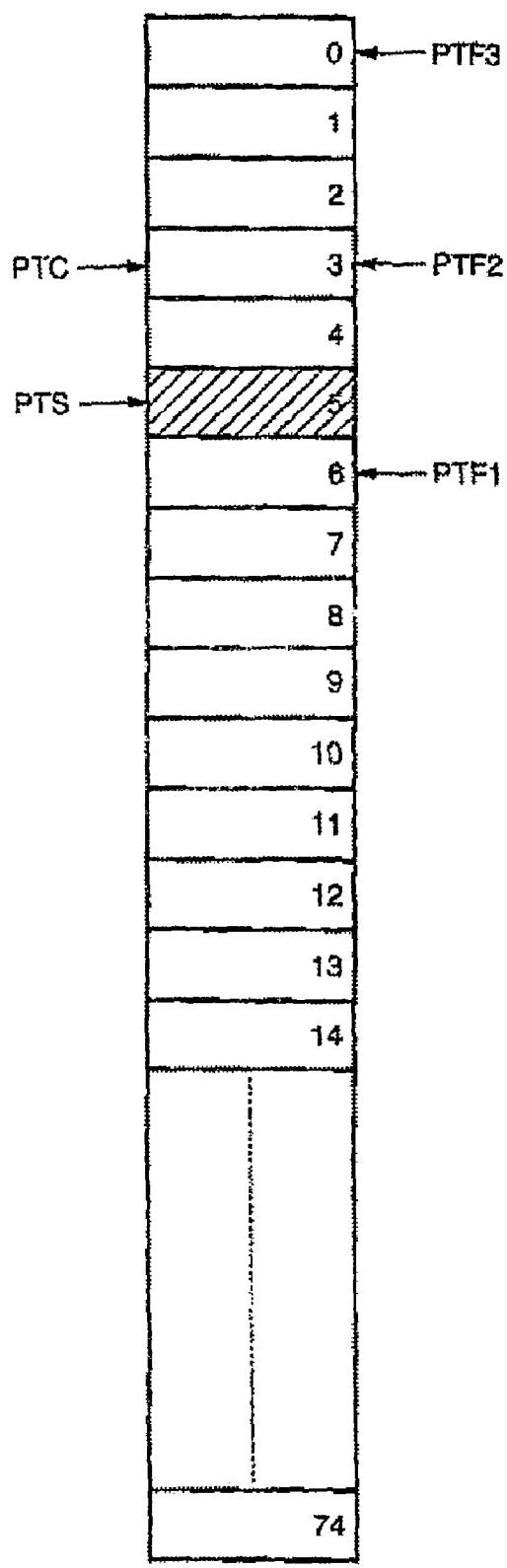
Figure 7D:
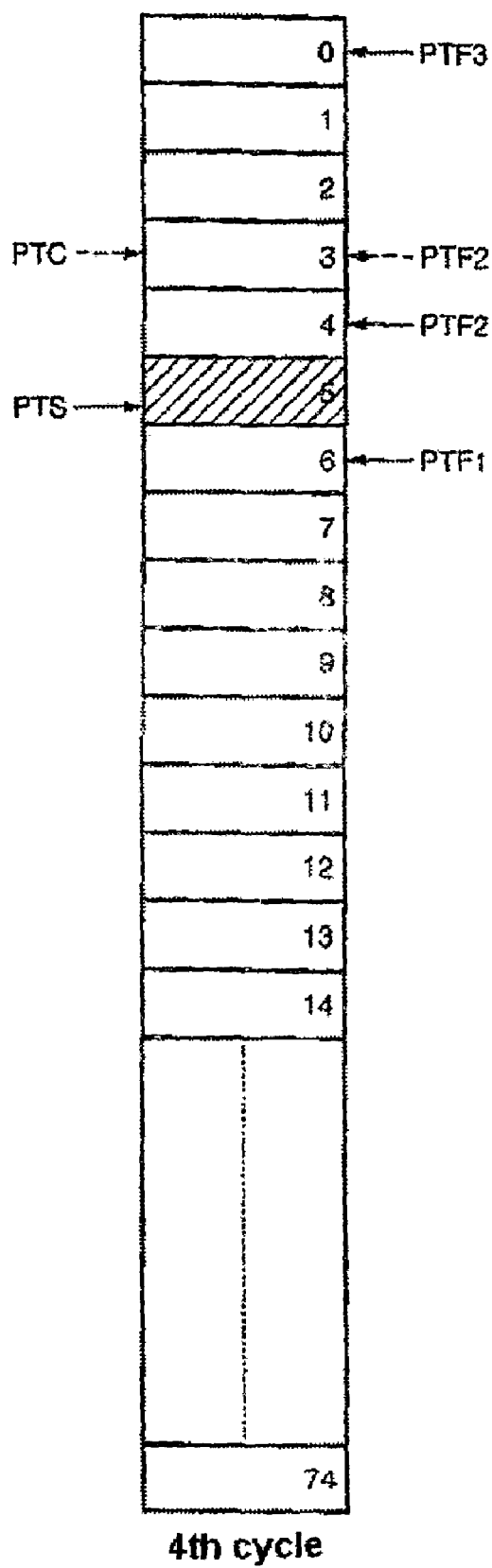
Figure 7E:
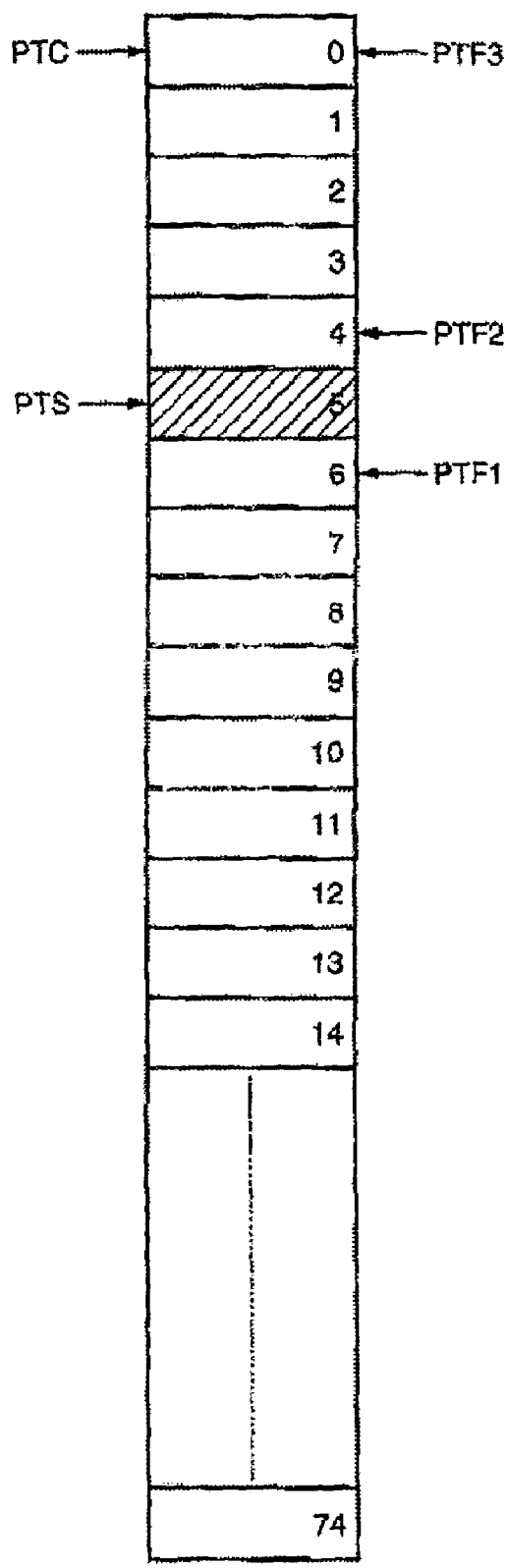

Then, as illustrated in FIG. 7b, the pointer PTF1 is incremented by one unit to make it point to address 6.

Since the signal SCM4 is equal to 0, there is no need to increment the pointer PTS and it continues to point to the value 5.

In the next cycle, in other words the third cycle (FIG. 7c), the signal VF1 is reset to zero and this time the signal VF2 denotes the active finger (finger No. 2).

The current pointer PTC is now the pointer PTF2, which points to address 3.

Therefore during this third cycle, the contents of the memory located at address 3 are extracted and summed in the adder ADD with the symbol present on finger No. 2. Then during the fourth cycle (FIG. 7d), the sum thus obtained is stored at the address pointed to by pointer PTF2, which is always address 3, before incrementing the pointer PTF2 by one unit, which then points to the end of the second cycle at address 4.

During the fifth cycle (FIG. 7e), the pointer PTF3 will be the current pointer PTC. The memory contents located at the address pointed to by pointer PTF3 are extracted and are summed with the symbol SY3.

Many possibilities are then available. In general, there is no need to rewrite this sum in the memory since it is assumed to represent the symbol recombined with all components received on all the fingers. Normally, this sum is delivered to the output from the combination unit during the second cycle, under steady state conditions. But in this case, in other words when starting or restarting in the middle of a slot, and since the first finger has not changed to addresses less then five, the contents of the memory extracted during cycles three and five are not right, and this symbol cannot be used. In this case, according to the invention, these symbols can be lost since the impact is low.

However, this symbol can be used if a simple multiplexer is used to reset the memory contents at the first access to each address.

But in any case, if this sum is delivered during the fifth cycle, it will not represent a reconstituted signal since it would not take account of the contributions of fingers 1 and 2.

This is why the invention advantageously does not deliver the sum that has been calculated at the output from the combination unit, since the transient phase is still active. This is the function of the inhibition means MIB. Although finger No. 3 is the last finger, the sum pointer PTS is not equal to the current point PTC. Consequently, the output from the logical gate Pl is still equal to 0, preventing the value delivered by the adder ADD from being delivered to the output OP.

Figure 7F:
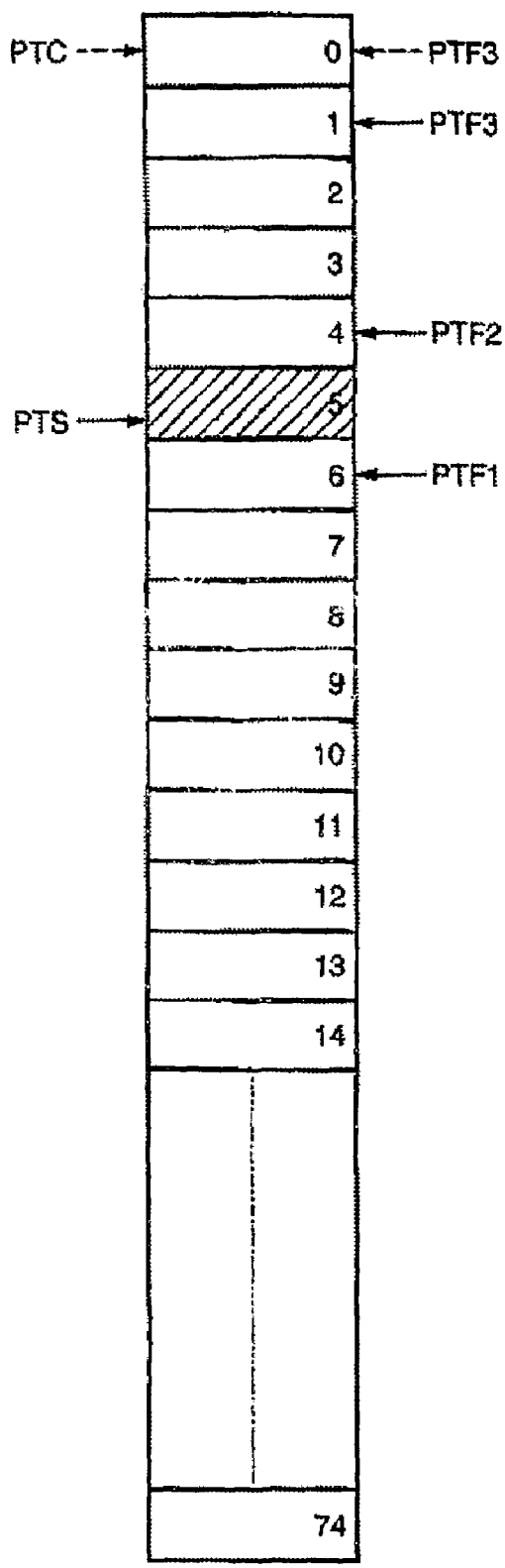

The pointer PTF3 is incremented during the sixth cycle (FIG. 7f).

Figure 7G:
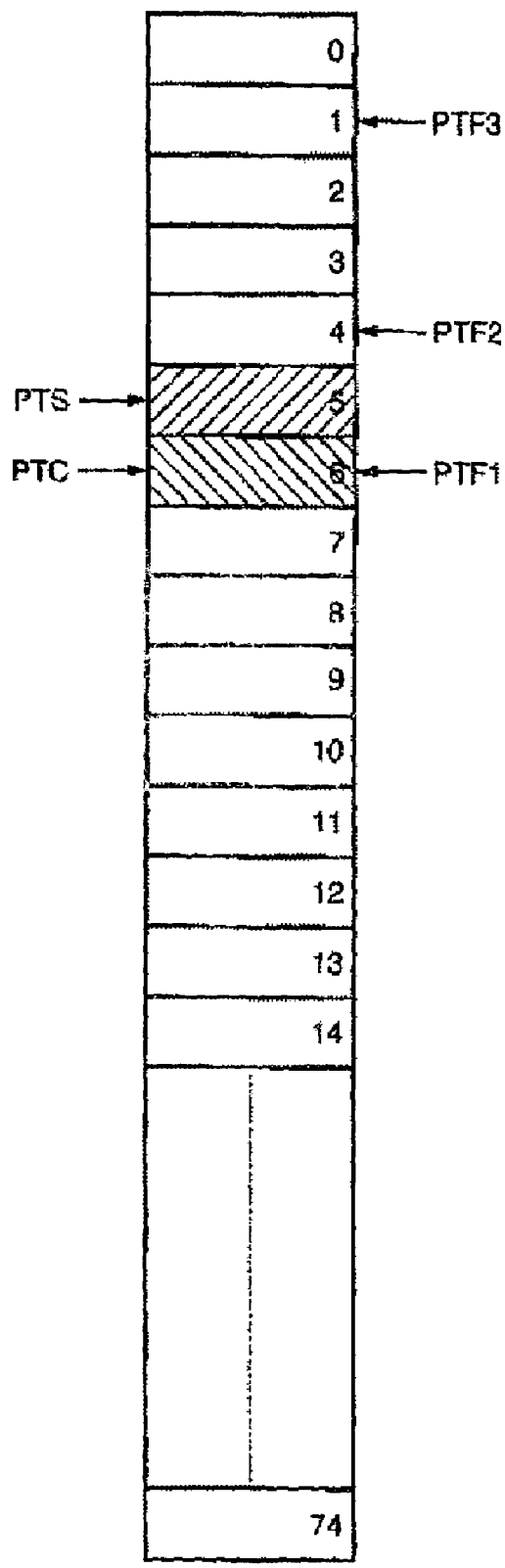

We will now refer to FIG. 7g that shows the situation in the seventeenth cycle, in other words when reading the next signal received on the first finger, for a spreading factor of four.

In this case, the pointer PTF1 which is the current pointer, points to address 6. The operations carried out during this seventeenth cycle would be similar to those carried out during the first cycle.

Figure 7H:
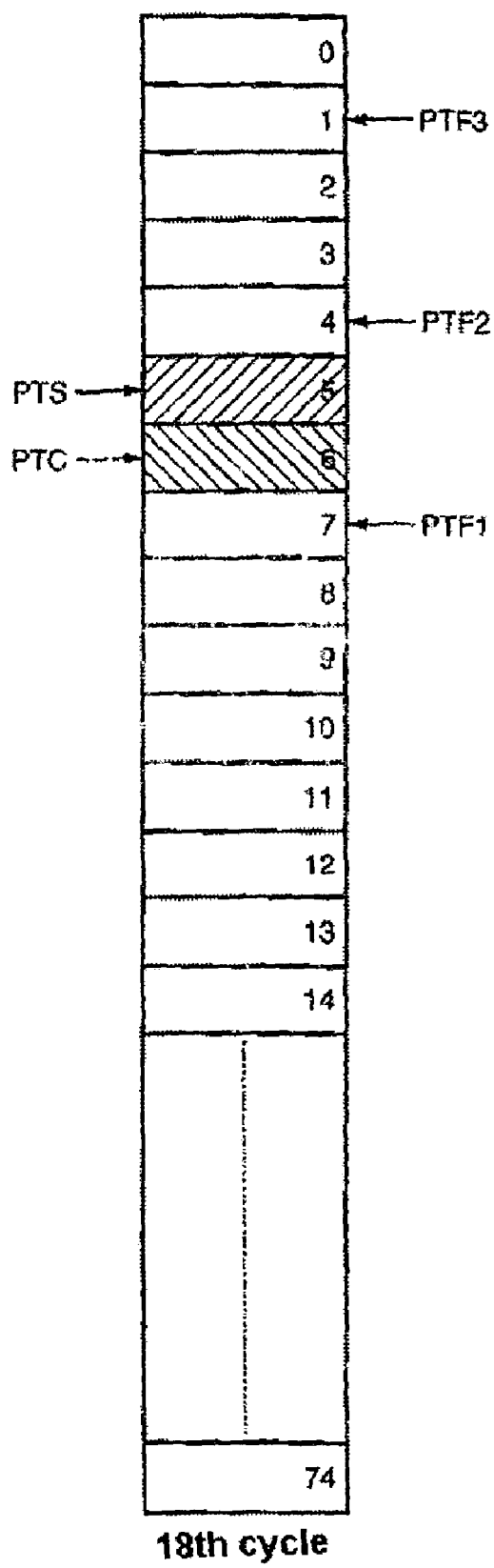

Then during the eighteenth cycle, after carrying out write operations comparable to the operations carried out during the second cycle, the value of the pointer PTF1 that now points to address 7 will be incremented by one unit (FIG. 7h).

Figure 7I:
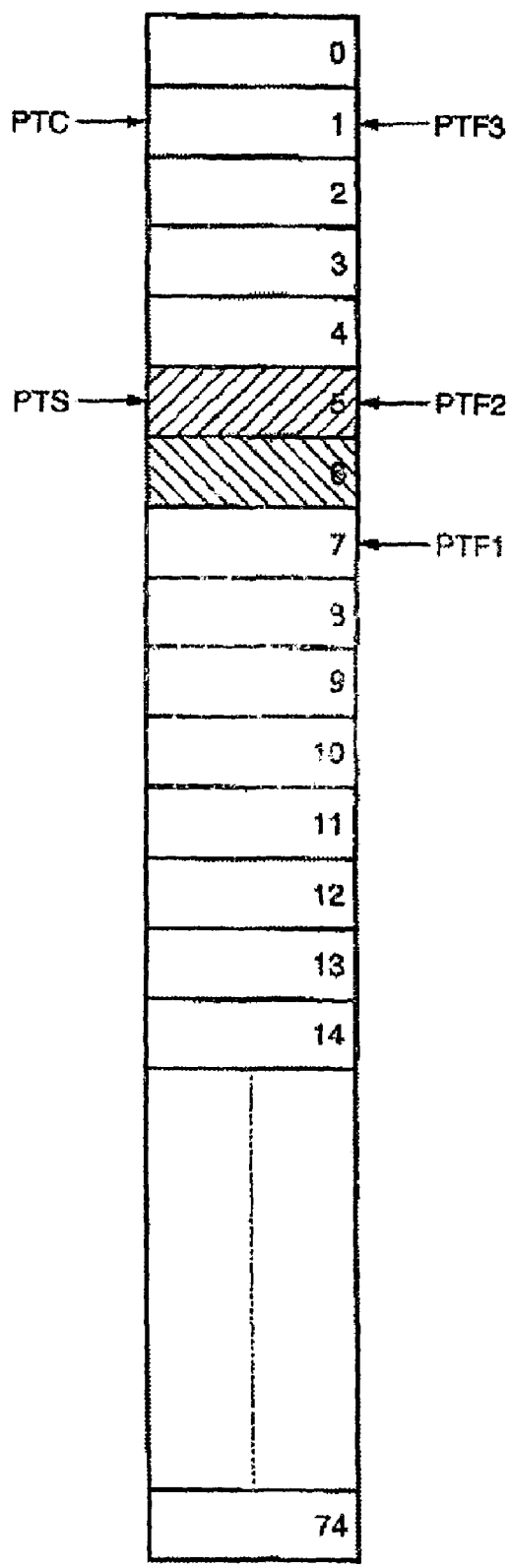
Figure 7J:
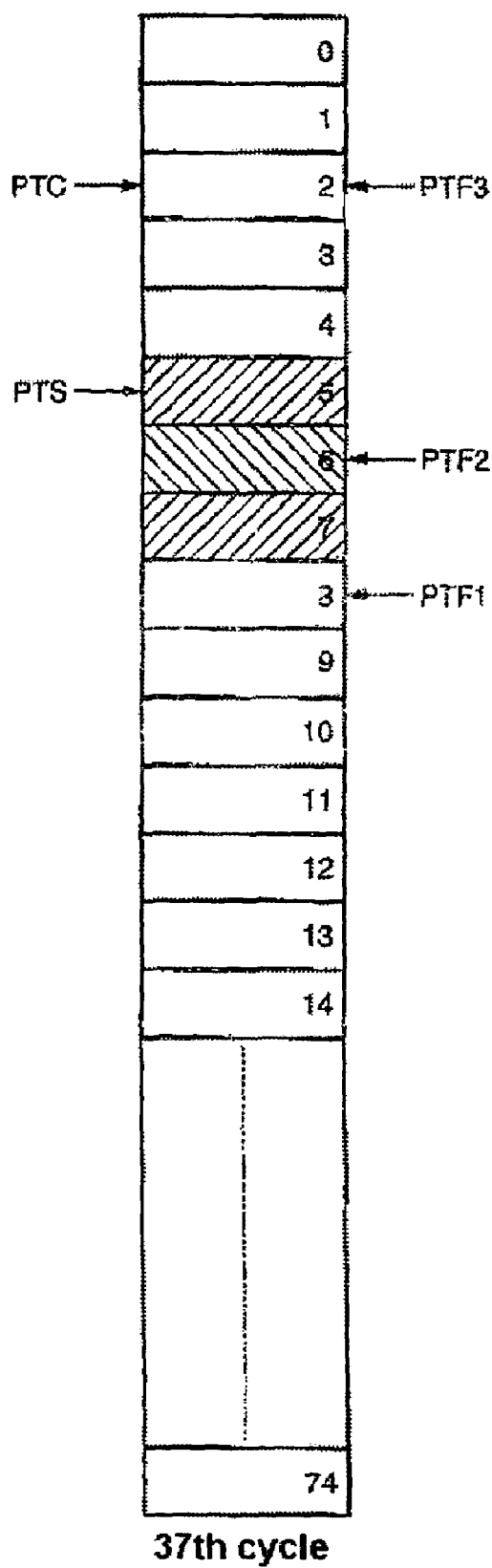
Figure 7K:
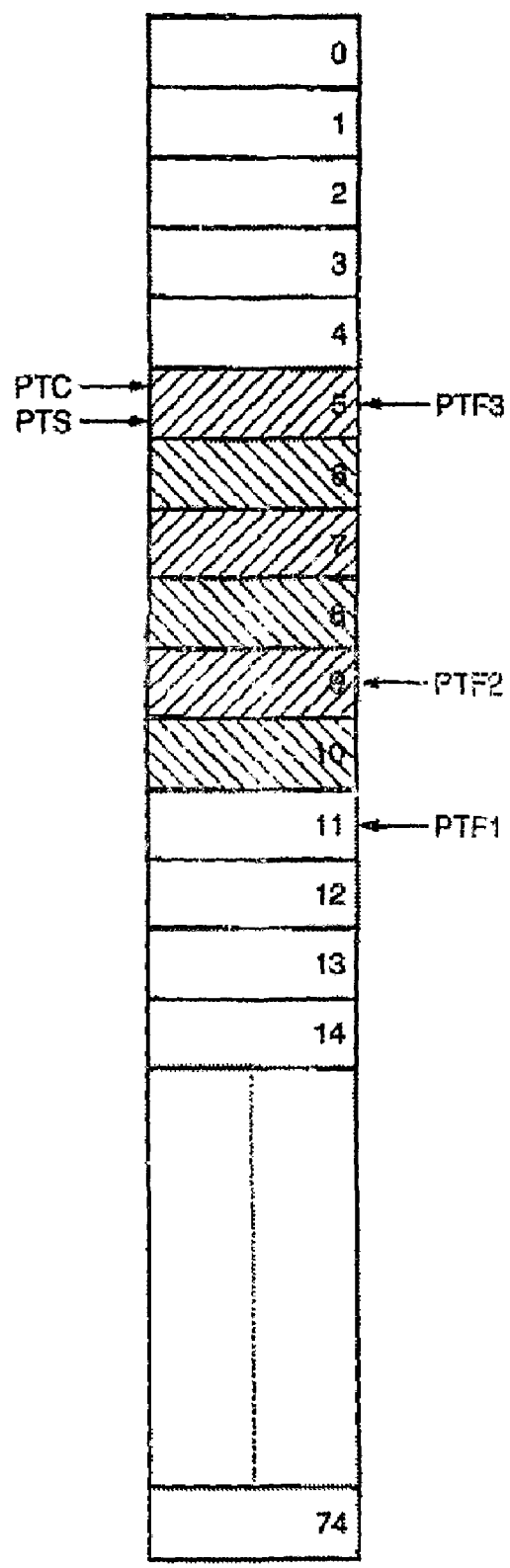
Figure 71:
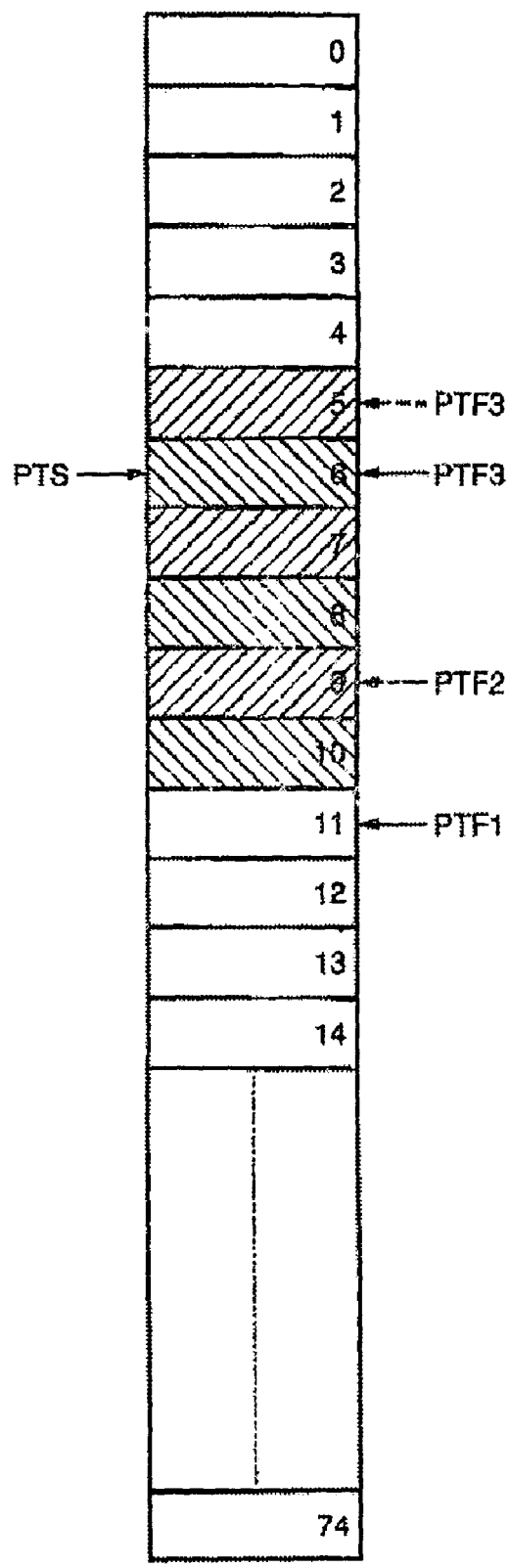

In the twentieth cycle, the pointer PTF2 was incremented by one unit and now points to address 5 (FIG. 7i).

In the thirty-seventh cycle (FIG. 7j), the current pointer is the pointer PTF3. However, the transient phase is still active, since the pointer PTF3 has not yet reached address 5, which is the address to which the pointer PTF1 was initially pointing. Consequently, there is still no information presented at the output from the combination unit.

However, on the eighty-fifth cycle (FIG. 7k), the current pointer is once again current pointer PTF3 that now points to address 5. The sum pointer PTS has not been incremented up to this point. At this moment, the current pointer PTC points to the same address as the sum pointer PTS. Moreover, since the pointer PTF3 is the pointer for the last finger, the two outputs from the logical gate PL are equal to 1, which means that the signal SCM4 will be set equal to the logical value 1.

Consequently, the contents of the memory pointed to at address 5 can be delivered at the output from the combination unit. This marks the end of the transient phase and the beginning of the steady state condition. This information actually corresponds to reconstitution of a complete symbol that took account of contributions received on fingers 1, 2 and 3 respectively.

In the next cycle (FIG. 7l), the pointer PTF3 is incremented by one unit, now pointing to address 6. Similarly, the pointer PTS also points to address 6.

In the future, the pointer PTS will track the pointer PTF3 so that when the third finger is active, the memory contents located at the address pointed at by this pointer PTF3 can be produced at the output from the combination unit.

FIGS. 8a to 8f illustrate operation with a transient phase during which the symbols arrive progressively on the receiver fingers, for example when starting the combination unit at the beginning of a frame.

In the example illustrated in FIGS. 8a to 8f, the first finger is finger No. 1 and the last finger is finger No. 3. Furthermore, finger No. 2 is delayed by one symbol behind finger No. 1, and finger No. 3 is delayed by one symbol behind finger No. 2. The spreading factor is still equal to 4.

In the first cycle (FIG. 8a), the initial addresses of the pointers are identical and are equal to 0.

Figure 8A:
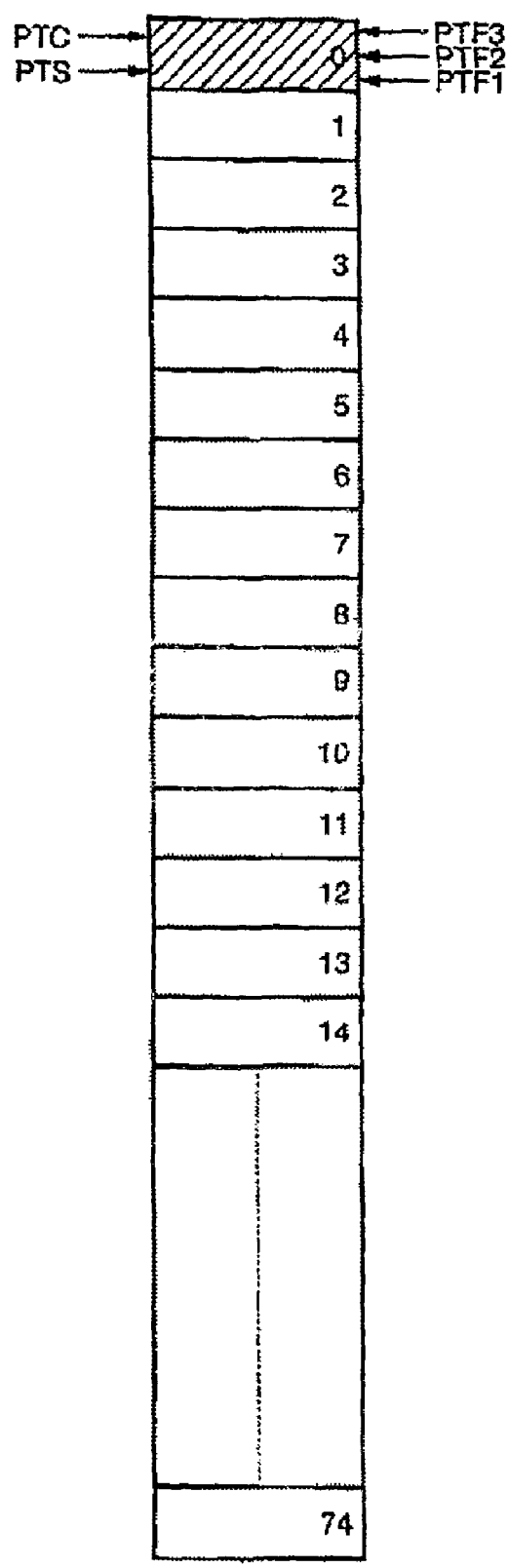
FIGS. 8a to 8f show another example of the variation of address pointers along the memory incorporated in the combination unit of the receiver according to the invention.

Finger No. 1 is active in FIG. 8a, and there is no other symbol present on the other fingers. Consequently, the current pointer PTC during the first cycle of the clock signal is equal to the pointer PTF1 and points to address 0. The adder ADD delivers the symbol SY1 received on this first finger, on its output.

During the second cycle of the clock signal (FIG. 8b), the symbol present on the first finger in the memory MM is stored at the address pointed to by pointer PTF1, in other words address 0.

Figure 8B:
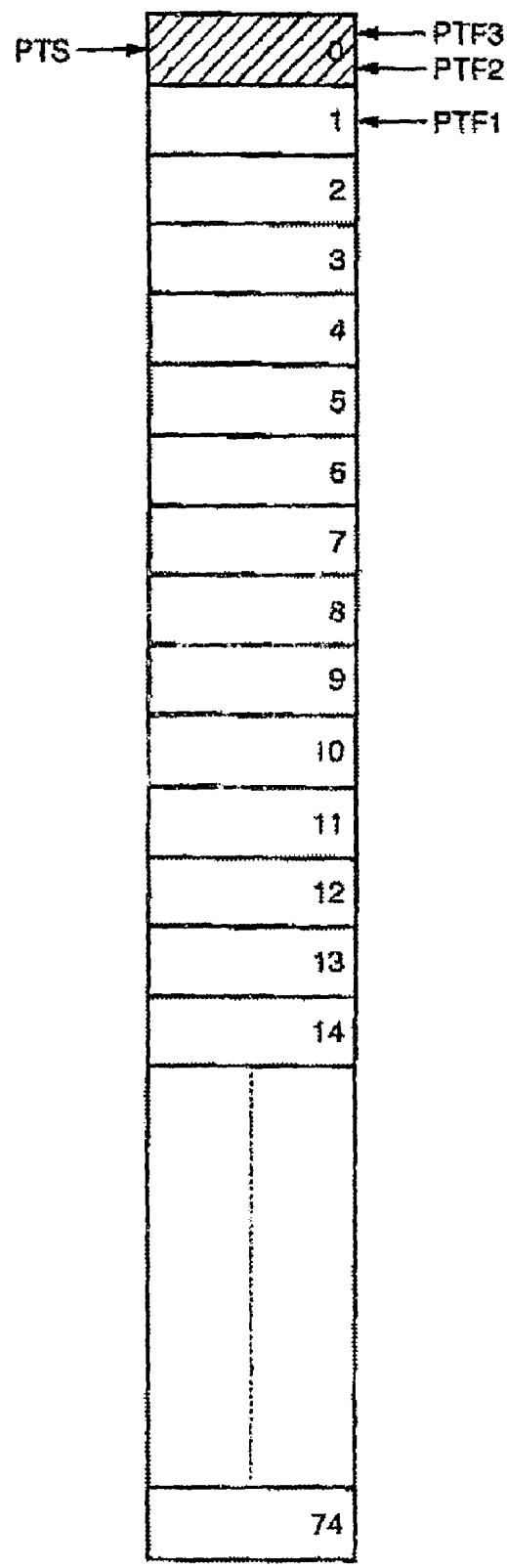
Figure 8C:
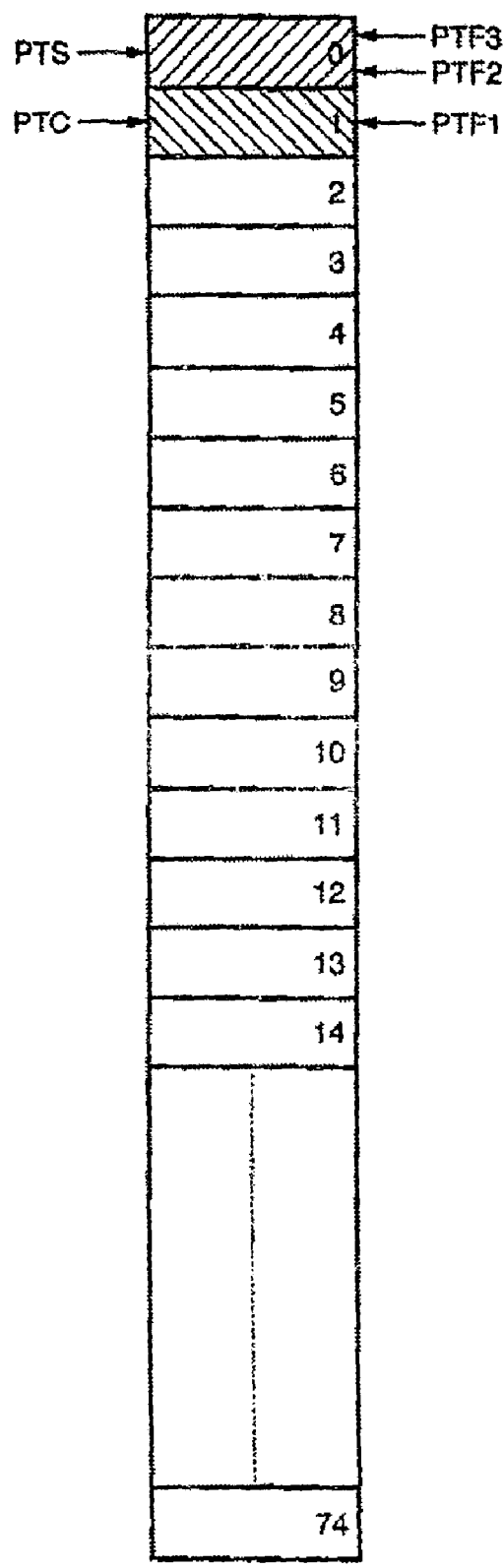
Figure 8D:
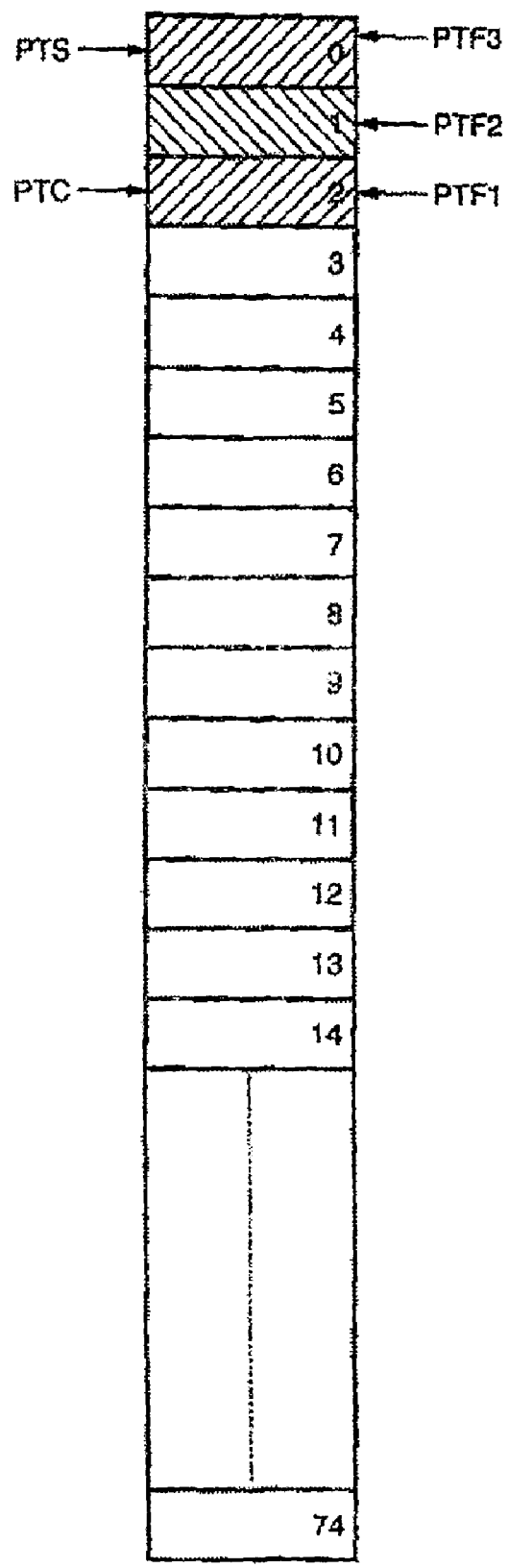
Figure 8E:
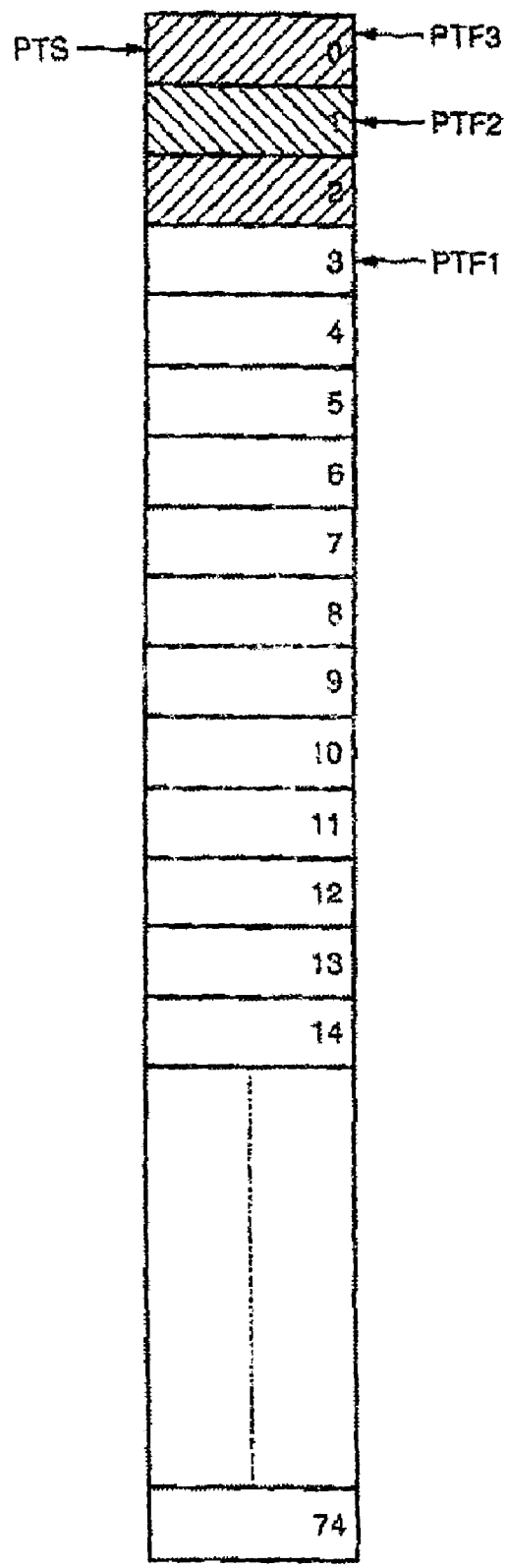
Figure 8F:
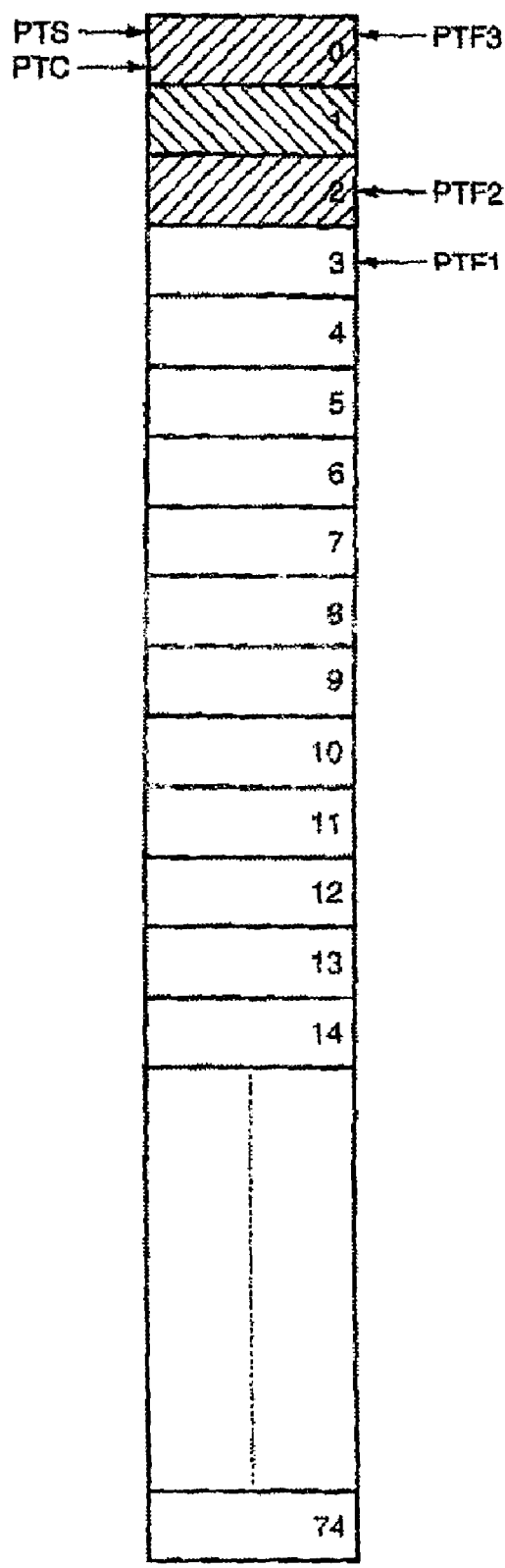

Then, as illustrated in FIG. 8b, the pointer PTF1 is incremented by one unit so that it now points to address 1.

Since no symbols were received on the other two fingers, the processing means will wait until the seventeenth cycle, in other words until reception of the next symbol on finger No. 1, and a first symbol on finger No. 2.

In the 17th cycle (FIG. 8c), the pointer PTF1 that is the current pointer, points to address 1. The operations carried out during this seventeenth cycle will be similar to those carried out during the first cycle.

In the 19th cycle, the pointer PTF2, which is the current pointer, points to address 0. During this nineteenth cycle, the operations carried out will be similar to the operations carried out during the seventeenth cycle, but for finger number two.

In the thirty-third cycle (FIG. 8d), the pointer PTF1, that is the current pointer, points to address 2. During this thirty-third cycle, the operations carried out will then be similar to the operations carried out during the first cycle. Note also that the pointer PTF2 was previously incremented by one unit and now points to address 1.

In the 34th cycle (FIG. 8e), the symbol on the first finger is stored in memory MM at the address pointed to by pointer PTF1, in other words to address 2, and the pointer PTF1 is incremented and now points to address 3.

The same operations are carried out in the 35th and 36th cycles, for the second symbol on finger number two.

In the 37th cycle (FIG. 8f), there is a symbol present on the last finger. The memory contents located at address 0 pointed to by pointer PTF3 are extracted from memory and summed with the symbol present on the last finger.

Furthermore, since the sum pointer PTS is equal to the current pointer that is the PTF3 pointer, this sum will be delivered to the output from the combination unit in the next cycle. And this sum actually corresponds to the recombination of the first symbol, for which the three contributions were received on the three fingers successively.

The transient phase is then complete, and the next step is the steady state condition phase during which the address pointers will remain separated by an address corresponding to the mutual delays between the paths. As in the previous example, the pointer PTS will track the pointer PTF3, so that when the third finger is active, the memory contents located at the address pointed to by this pointer PTF3 can be delivered at the output from the combination unit.

Therefore, a smaller memory can be used, particularly due to the use of address pointers circulating along this memory. Instead of storing one value for each finger to make the sum later, the sum is calculated in real time, and all that is saved is this sum. Furthermore, an adder with the size of a symbol is all that is necessary.

Furthermore, the frequency of the clock signal only depends on the number of cycles necessary to process all fingers and the duration of one symbol. This frequency is independent of the channel delay spread parameter representing the maximum delay between paths.

Furthermore, although it is not essential, it is always possible to reset the contents of the memory located at the address pointed to by the address pointer of the finger that accesses this address before the others, at the time of arrival of a symbol on this finger.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method of processing an incident signal within a "RAKE" receiver with several fingers, comprising:
   receiving the incident signal formed from symbols output from at least one multi-path transmission channel for which each path transports a delayed version of the signal;
   detecting paths for allocation to at least some of the fingers;
   combining the information output from each finger assigned to a path within a memory capable of storing a number of symbols larger than the maximum delay between the paths and which can be addressed by address pointers associated with the corresponding fingers including defined first and last fingers, the combination step including:
      pointing address pointers in a steady state phase to addresses with mutual spacings taking account of mutual delays in the number of symbols between the paths;
      storing a current symbol received on the first finger in the memory at the write address denoted by its corresponding address pointer;
      incrementing the address pointer; and
      before reception of the next symbol on this first finger, extracting the contents of the memory stored at the read addresses denoted by all the other address pointers in sequence, summing these contents in sequence with the symbols present on the other fingers, then storing these sums, except for the sum corresponding to the last finger, at the same read addresses before incrementing all the other pointers, and delivering the last sum corresponding to the last finger at the output from the receiver.

2. The method according to claim 1, wherein combining comprises a transient phase in which initial addresses of the address pointers are all equal to a same initial value, and wherein the different fingers output symbols progressively and at corresponding different instants, and wherein the same processing is done in this transient phase as is done in the steady state phase for the fingers on which symbols are present.

3. The method according to claim 1, wherein combining comprises a transient phase in which initial addresses of the address pointers are predetermined taking account of any differences in the number of symbols between the paths, and wherein the same processing is done in this transient phase as is done in the steady state phase, except for delivering the last sum corresponding to the last finger at the output from the receiver.

4. The method according to claim 1, wherein each symbol is composed of several chips, and a rate of the combination step is controlled by a clock signal with a period equal to the duration of one chip divided by a predetermined number, and further including extracting the memory contents denoted by a pointer during one cycle of the clock signal and incrementing the pointer corresponding to the next cycle.

5. The method according to claim 1, wherein the memory contents are used without initializing the memory beforehand by adding zero to the value of the symbol on the first finger before writing it in memory.

6. The method according to claim 1, further comprising resetting to zero the contents of the memory located at the address pointed to by the address pointer of the finger that accesses this address before the other fingers when a symbol arrives on this finger.

7. The method according to claim 1, wherein the number of symbols that can be stored in the memory is equal to the number of symbols corresponding to the maximum delay between the paths, plus one.

8. A "RAKE" receiver, comprising:
   a signal input to receive an incident signal formed from symbols output from at least one multi-path transmission channel in which each path transports a delayed version of the signal;
   several fingers, each intended to demodulate a given path at a given instant;
   a control unit designed to detect and allocate paths to at least some of the fingers; and
   a combination unit connected to the output from the fingers and designed to sum the information produced at the output from each finger, the combination unit comprising:
      a memory capable of storing a number of symbols corresponding to the maximum delay between the paths;
      address pointers associated with each corresponding finger; and
      processing means with a steady state phase during which the address pointers point to addresses with mutual spacings taking account of the mutual delays between the paths, and being capable of receiving a current symbol on a first finger during this steady state phase, storing it in the memory at the write address given by the corresponding address pointer, and then incrementing the address pointer, and before reception of the next symbol on this first finger, being capable of reading the contents of the memory stored at the read addresses denoted by the other address pointers, in sequence, summing these contents with the corresponding symbols present on the other fingers, and then storing these sums, except for the sum corresponding to the last finger, at the same read addresses before incrementing the pointers, the last sum corresponding to the last finger being delivered at the output from the combination unit.

9. The receiver according to claim 8, wherein the processing means has a transient phase in which the initial addresses of the address pointers are all equal to the same initial value, the different fingers delivering symbols progressively and at different instants, and the processing means is capable of performing the same processing during this transient phase as during the steady state phase, and for the fingers on which the symbols are present.

10. The receiver according to claim 8, wherein the processing means has a transient phase in which the initial addresses of the address pointers are predetermined taking account of offsets in the number of symbols between paths, and the processing means further including an inhibition functionality that prevents delivery of the last sum corresponding to the last finger at the output of the receiver during the transient phase.

11. The receiver according to claim 8, wherein each symbol is composed of several chips, wherein a rate of the processing means is controlled by a clock signal with a period equal to the duration of one chip divided by a predetermined number, wherein the processing means extracts the contents of the memory denoted by a pointer during one cycle of the clock signal and increments the corresponding pointer in the next cycle.

12. The receiver according to claim 8, wherein the processing means comprises a multiplexer that adds zero to the value of the symbol on the first finger before writing it in memory, so as to be able to use the memory content without it being initialized in advance.

13. The receiver according to claim 8, wherein the processing means comprises a circuit to reset the memory contents located at the address pointed to by the address pointer of the finger that accesses this address before the others to zero, when a symbol arrives on this finger.

14. The receiver according to claim 8, wherein several groups of fingers are assigned to several corresponding transmission channels, and several combination units are connected to corresponding groups of fingers.

15. The receiver according to claim 8, wherein the number of symbols that can be stored in the memory is equal to the number of symbols corresponding to the maximum delay between the paths, plus one.

16. The receiver according to claim 8, wherein the receiver is made in the form of an integrated circuit.

17. The receiver according to claim 8, wherein the receiver is a component part of a wireless communication system.

18. The receiver according to claim 17, wherein the component part is a mobile cell phone.

19. A method of processing an incident signal within a "RAKE" receiver having several fingers, comprising:
   receiving the incident signal formed of symbols output from at least one multi-path transmission channel for which each path transports a delayed version of the signal;
   detecting paths for allocation to at least some of the fingers; and
   combining the information output from each finger assigned to a path within a memory sized to be capable of storing a number of symbols larger than the maximum delay between the paths, the combining including addressing locations in the memory using address pointers associated with the corresponding fingers, wherein combining includes a steady state phase of:
      using the address pointers to point to locations with mutual spacings taking account of mutual delays between the paths;
      storing a current symbol received on a first finger in the memory at the write address location denoted by the corresponding address pointer; and
      incrementing this address pointer.

20. The method of claim 19, the combining further including, before reception of the next symbol on this first finger:
   extracting the contents of the memory stored at the read locations denoted by all the other address pointers in sequence;
   summing the contents in sequence with the symbols present on the other fingers; and
   storing these sums, except for the sum corresponding to the last finger, at the same read locations before incrementing the pointers.

21. The method of claim 20 further wherein combining further comprises delivering the last sum corresponding to the last finger at the receiver output.

22. An integrated circuit including the RAKE receiver performing the method of claim 19.

23. A mobile telephone device including the RAKE receiver performing the method of claim 19.

24. A method of processing an incident signal within a "RAKE" receiver having several fingers, comprising:
   receiving the incident signal formed of symbols output from at least one multi-path transmission channel for which each path transports a delayed version of the signal;
   detecting paths for allocation to at least some of the fingers; and
   combining the information output from each finger assigned to a path within a memory sized to be capable of storing a number of symbols larger than the maximum delay between the paths, the combining including addressing locations in the memory using address pointers associated with the corresponding fingers, wherein combining includes a transient phase of:
      setting initial locations for the address pointers to be equal to a same initial value;
      outputting symbols from the different fingers progressively and at corresponding different instants;
      storing a current symbol received on a finger in the memory at the write address location denoted by the corresponding address pointer; and
      incrementing this address pointer.

25. The method of claim 24, the combining further including, before reception of the next symbol on this first finger:
   extracting the contents of the memory stored at the read locations denoted by all the other address pointers in sequence;
   summing the contents in sequence with the symbols present on the other fingers; and
   storing these sums, except for the sum corresponding to the last finger, at the same read locations before incrementing the pointers.

26. A RAKE receiver that receives an incident signal having a plurality of paths, comprising:
   a plurality of fingers;
   a memory having a plurality of addressable locations storing a number of symbols larger than the maximum delay between the paths;
   a plurality of address pointers associated with corresponding ones of the plurality of fingers, the address pointers being set to initial locations in the memory which take in account differences in a number of symbols between paths of the incident signal;
   a data handling functionality that causes a current symbol received on a given finger to be stored in the memory at a write location given by its corresponding address pointer; and
   a summation functionality that causes the contents of the memory stored at read locations given by all the address pointers corresponding to other fingers to be extracted in sequence and summed, where each sequential sum except for a last sequential sum corresponding to a last finger being stored at the same read locations, and wherein the last sequential sum corresponding to the last finger being delivered as output from the receiver.

* * * * *